US005854899A

United States Patent [19]
Callon et al.

[11] Patent Number: 5,854,899
[45] Date of Patent: Dec. 29, 1998

[54] METHOD AND APPARATUS FOR MANAGING VIRTUAL CIRCUITS AND ROUTING PACKETS IN A NETWORK/SUBNETWORK ENVIRONMENT

[75] Inventors: Ross W. Callon, Bedford; William M. Salkewicz, Chelmsford, both of Mass.; Andrew H. Smith; Asher Waldfogel, both of Palo Alto, Calif.

[73] Assignee: Bay Networks, Inc., Santa Clara, Calif.

[21] Appl. No.: 647,295

[22] Filed: May 9, 1996

[51] Int. Cl.$^6$ ..................................................... G06F 13/00
[52] U.S. Cl. ............................... 395/200.68; 395/200.69; 370/235; 370/352
[58] Field of Search ........................... 395/200.5, 200.53, 395/200.54, 200.6, 200.61, 200.62, 200.68, 200.65, 200.69, 200.72; 370/229, 235, 237, 352, 396, 398, 400, 404

[56] References Cited

U.S. PATENT DOCUMENTS

| | | | |
|---|---|---|---|
| 5,115,495 | 5/1992 | Tsuchiya et al. | 395/200.69 |
| 5,128,926 | 7/1992 | Perlman et al. | 370/248 |
| 5,233,604 | 8/1993 | Ahmadi et al. | 370/238 |
| 5,251,205 | 10/1993 | Callon et al. | 370/392 |
| 5,253,248 | 10/1993 | Dravida et al. | 370/228 |
| 5,452,294 | 9/1995 | Natarajan | 370/354 |
| 5,452,297 | 9/1995 | Hiller et al. | 370/395 |
| 5,467,345 | 11/1995 | Cutler, Jr. et al. | 370/229 |
| 5,471,467 | 11/1995 | Johann | 370/238 |
| 5,473,602 | 12/1995 | McKenna et al. | 370/256 |
| 5,491,690 | 2/1996 | Alfonsi et al. | 370/404 |
| 5,495,479 | 2/1996 | Galaand et al. | 370/404 |
| 5,497,368 | 3/1996 | Reijnierse et al. | 370/351 |
| 5,502,816 | 3/1996 | Gawhek et al. | 395/200.57 |
| 5,600,530 | 2/1997 | Takano et al. | 370/218 |
| 5,627,822 | 5/1997 | Edmaier et al. | 370/218 |
| 5,652,751 | 7/1997 | Sharony | 370/227 |

OTHER PUBLICATIONS

Callon, et al, "Routing in an Internetwork Environment," The Interoperability Report, Aug. 1989, vol. 3, No. 8, pp. 2–7.

Heinanen, "Multiprotocol Encapsulation Over ATM Adaptation Layer 5," Network Working Group Request for Comments: 1483, Jul. 1993, pp. 1–16.

Laubach, "Classical IP and ARP over ATM," Network Working Group Request for Comments: 1577, Jan. 1993, pp. 1–17.

Moy, "OSPF (Open Shortest Path First) Version 2," Network Working Group Request for Comments: 1583, Mar. 1994.

Callon, "Integrated PNNI for Multi–Protocol Routing," ATM Forum Technical Committee, 94–0789, Sep. 26, 1994, pp. 1–7.

Callon et al, "Methods for Routing of Internetwork Level Protocols over ATM," ATM Forum Technical Committee, 96–0353, Apr. 15, 1996.

Callon et al, "Issues and Approaches for Integrated PNNI," ATM Forum Technical Committee, 96–0355, Apr. 15, 1996.

Private Network–Network Interface Specification Version 1.0 (PNNI 1.0), The ATM Forum Technical Committee, af–pnni–0055.000, Mar. 1996.

Katz et al, NBMA Next Hop Resolution Protocol (NHRP), Internet Draft (draft–ieft–rolc–nhrp–04.txt), May 1995.

*Primary Examiner*—Parshotam S. Lall
*Assistant Examiner*—Viet Vu
*Attorney, Agent, or Firm*—Blakely, Sokoloff, Taylor & Zafman LLP

[57] ABSTRACT

A system for managing virtual circuits and determining proper routing of packets in a network environment. The network includes a connection-oriented subnetwork and an arrangement of routers coupled to the connection-oriented subnetwork. The system determines paths to each exit router by considering all possible paths through the connection-oriented subnetwork. The system also determines paths to each exit router by considering existing virutal circuits through the connection-oriented subnetwork. Finally, the system determines and establishes a most beneficial new virtual circuit for the network. Additionally, the rate at which new virtual circuits are established may be regulated by the system.

15 Claims, 17 Drawing Sheets

METHOD AND APPARATUS FOR MANAGING VIRTUAL CIRCUITS AND ROUTING PACKETS IN A NETWORK/SUBNETWORK ENVIRONMENT

BACKGROUND OF THE INVENTION

1. Field of the Invention

The present invention relates to routing packets in a network environment. More specifically, managing network connections in a network having routers coupled to a connection-oriented subnetwork.

2. Background

Computer networks provide a mechanism for transferring information between various locations. Large computer networks may be extended around the world to interconnect multiple geographic sites and thousands of hosts. Additionally, various types of internetworking devices have been developed to permit users (or nodes) of one network to communicate with users (or nodes) of other networks. These devices are often referred to as routers or gateways.

To transfer information from one node on a network to a node or group of nodes on another network, it is necessary to determine a path through the interconnected series of links and networks for the information to be propagated. Various routing protocols have been developed for calculating routes across interconnected networks.

Networks may include one or more "virtual networks" or "virtual subnetworks." A common situation for implementing virtual networks includes the routing of the internetwork protocol (IP) type networking packets over an asynchronous transfer mode (ATM) subnetwork. An ATM subnetwork is a connection-oriented network, meaning that data is forwarded over virtual circuits (VCs) by switching/forwarding devices referred to as ATM switches. Other examples of connection-oriented networks include X.25, Frame Relay, and Plain Old Telephone Service (POTS).

An ATM switch cannot forward data between a particular source and destination unless the ATM switch has first obtained and stored state information to manage the virtual circuit specifically related to the flow of data between the particular source and destination. ATM switches provide high performance operation by forwarding a large amount of data in a short period of time. The use of connection-oriented virtual circuits allows packets to be divided into smaller, fixed-length cells. Maintaining state information and using small cells minimizes the delay at the ATM switch when forwarding data.

Routers are connected to the ATM subnetwork as well as other subnetworks and are used to collect packets corresponding to multiple flows of datagrams from multiple sources to multiple destinations. Virtual circuits across the ATM subnetwork are used to carry information between various routers coupled to the subnetwork. A single virtual circuit, or a small number of virtual circuits, may be established and utilized between any particular pair of routers.

The routers use a routing protocol between one another to calculate routes between the various routers. Where a virtual circuit exists between two routers, the routers can "advertise" a corresponding link between them into the routing protocol, thereby allowing other routers to learn of the link. A common routing protocol is a link state routing protocol. In a link state routing protocol, each node in the network (for example, a router) maintains information about each link in the network. A topology state routing protocol is a refinement of link state protocol in which significant status about the internal structure or operation of other nodes in the network may be maintained in addition to information about links.

In large networks, which may include hundreds or thousands of routers, it is impractical to maintain virtual circuits between every pair of routers. ATM switches are limited in their ability to store network state information. Therefore, the large amount of network state information required if all possible virtual circuits were established would be impractical and inefficient. Additionally, such a configuration would require that the network layer routing protocol consider every possible virtual circuit when calculating a route across the ATM subnetwork. Such a calculation cannot provide the efficient route computation necessary to efficiently transmit data over a network.

Instead of establishing every possible virtual circuit, a smaller set of virtual circuits are established between specific pairs of routers. Since virtual circuits are not established for every pair of routers, the resulting path between a particular pair of routers may utilize intermediate routers. This type of routing may be referred to as "roundabout routing" because it uses an indirect path via multiple routers to traverse the ATM subnetwork. The roundabout routing method locates the best path to the destination using only the set of virtual circuits already established across the subnetwork. This method reduces the overall throughput of the network because many paths will pass through multiple routers, thereby increasing the overall delay involved in transferring a packet to its destination.

Another type of routing is referred to as "shortcut routing." Shortcut routing determines which exit router provides the best path for transmitting a particular packet toward its destination. A virtual circuit is then established between the entry router and the optimal exit router, thereby providing a direct path across the ATM subnetwork. Once this direct virtual circuit is established, shortcut routing minimizes the delay associated with transferring packets across the ATM subnetwork by always establishing a direct virtual circuit to the optimal exit router. However, using shortcut routing in every situation is inefficient due to limitations of the ATM subnetwork in establishing a large number of virtual circuits in a short period of time. Furthermore, as discussed above, ATM switches are limited in their ability to store link state information. As additional virtual circuits are established due to shortcut routing, additional state information must be stored by the routers and ATM switches. Therefore, the use of shortcut routing may cause inefficient operation of the network.

Additional problems arise in relation to the management of the virtual circuits in a network. Certain virtual circuits may become unnecessary or underutilized due to changes in the flow of data. Furthermore, new virtual circuits may be required when certain paths across the network become congested. Proper management of virtual circuits is necessary to provide efficient operation of the network.

It is therefore desirable to provide a system for managing virtual circuits in a manner that provides for efficient network operation. Furthermore, it is desirable to determine when to use existing virtual circuits for forwarding packets to a destination, and when it is preferable to establish a new virtual circuit to the destination.

SUMMARY OF THE INVENTION

The present invention provides a system for managing virtual circuits in a network environment. As part of the virtual circuit management, the invention alleviates the problems associated with roundabout routing and shortcut routing discussed above. Additionally, traffic volume and congestion are monitored to maintain efficient network operation. The management system determines whether to forward packets to a particular destination using existing virtual circuits or whether new virtual circuits should be established to the destination. The inventive management system does not always establish a new virtual circuit for routing packets nor does it always utilize an existing virtual circuit for routing packets. Instead, the management system determines which approach is preferable by considering the ability of existing virtual circuits to efficiently forward packets to specific destinations. In some cases, the present invention will use an existing virtual circuit which is not part of the optimal path to the destination. Virtual circuits are controlled by considering the tradeoff between the level of state information in the network and the quality of existing paths provided to various destinations.

The invention performs its management processing as a background operation, thereby providing a high probability that when any particular packet arrives at a router, a feasible and efficient virtual circuit is already available for forwarding the packet. As an alternative, the necessary calculations have already been performed and stored, thereby permitting quick changes to the network upon arrival of a packet.

In one embodiment of the invention, a system manages virtual circuits in a network having a connection-oriented subnetwork. The invention determines paths to each exit router by considering all possible paths through the connection-oriented subnetwork. The system also determines paths to each exit router by considering existing virtual circuits through the connection-oriented subnetwork. Finally, the system determines and establishes a most beneficial new virtual circuit for the network. Additionally, the rate at which new virtual circuits are established may be regulated by the system.

Another feature of the invention determines existing path qualities and an optimal path quality to an exit router and reroutes an existing virtual circuit as necessary. When determining whether to reroute an existing virtual circuit, the system considers both a cost and a benefit associated with rerouting the virtual circuit.

In another embodiment of the invention, the number of existing virtual circuits and the number of outstanding virtual circuit setup requests are considered before establishing a new virtual circuit.

Another aspect of the invention provides a timer for controlling the frequency at which new virtual circuits are established.

An additional feature of the invention provides that the system for managing virtual circuits is implemented as a background processing task.

A further feature of the invention performs layered routing where a first protocol is used for routing within a connection-oriented subnetwork and a second protocol is used for routing between a plurality of routers.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the present invention. However, those skilled in the art will appreciate that the present invention may be practiced without these specific details. In other instances, well known methods, procedures, components, protocols, and circuits have not been described in detail so as not to obscure the present invention.

The present invention is related to a system for managing virtual circuits and routing packets in a network having routers coupled to a connection-oriented subnetwork. For illustration purposes, the following detailed description refers to an ATM subnetwork as the connection-oriented subnetwork. Those skilled in the art will understand that an ATM subnetwork is only one type of connection-oriented subnetwork. Other types of connection-oriented subnetworks include, but are not limited to, X.25, Frame Relay, and POTS (Plain Old Telephone Service). The present invention may be applied to any type of connection-oriented subnetwork using the structures and methods described herein and is not limited to ATM subnetworks.

Figure 1:
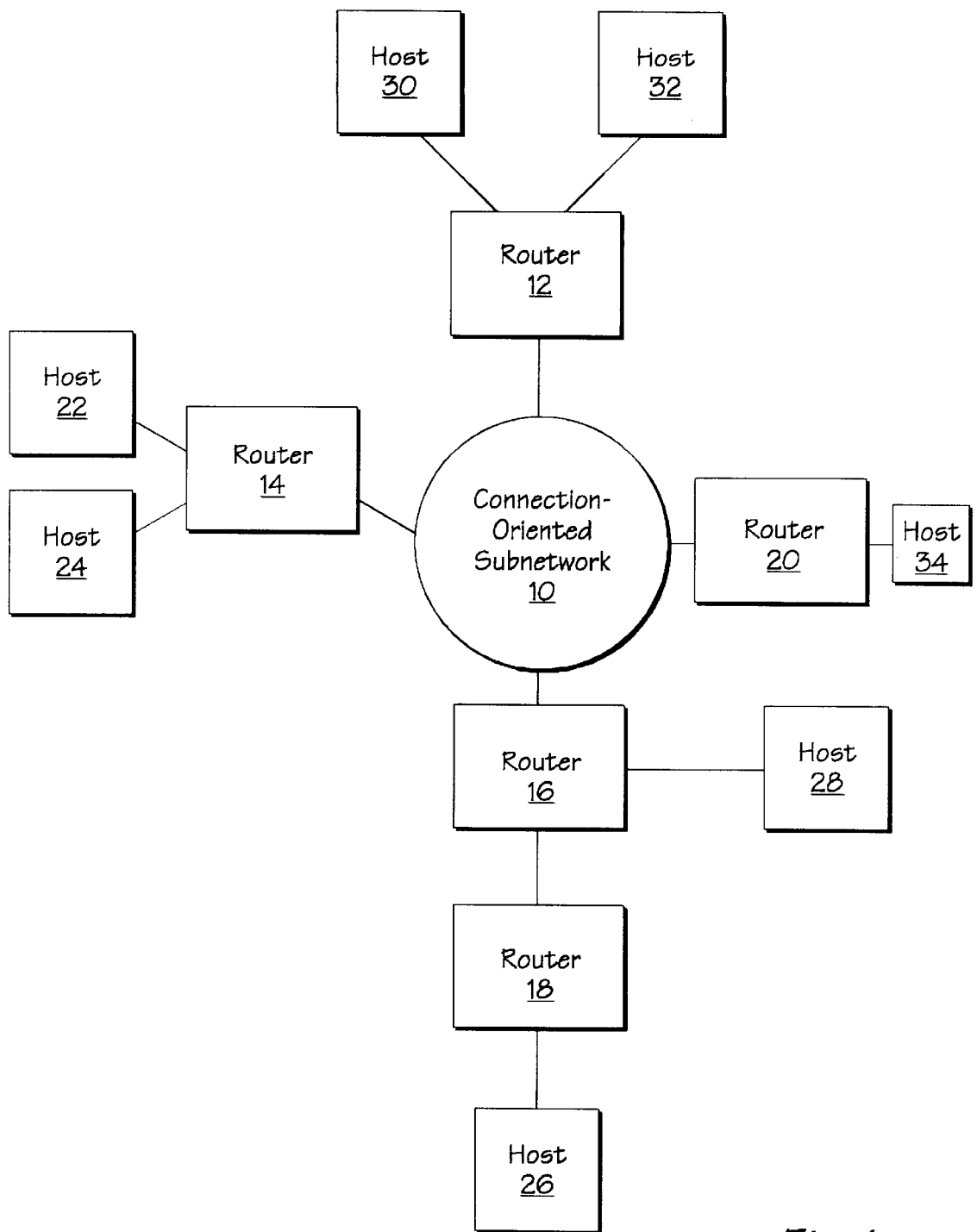
FIG. 1 is a diagram of a network configuration having multiple routers connected to a connection-oriented subnetwork capable of utilizing the present invention.

Referring to FIG. 1, a diagram of a simple network configuration is illustrated in an embodiment having multiple routers coupled to a connection-oriented subnetwork. The illustrated network has been reduced in size for explanation purposes. Actual networks may include hundreds or thousands of routers with numerous hosts connected to each router.

The configuration illustrated in FIG. 1 includes a connection-oriented subnetwork 10 and five multiprotocol routers (12, 14, 16, 18, and 20). Several hosts or "Data Terminal Equipment (DTE)" (22, 24, 26, 28, 30, 32, and 34)

are connected to the routers. Four routers (12, 14, 16, and 20) are directly connected to connection-oriented subnetwork 10 while router 18 is coupled to router 16. If router 18 has a packet which must be delivered to a host 28, the packet may be forwarded via router 16 to host 28. In this case, the packet need not be forwarded across connection-oriented subnetwork 10. However, if router 16 has a packet for delivery to a host 22 attached to router 14, then router 16 must forward the packet across subnetwork 10. Similarly, any other router having a packet which must be delivered to a router located across subnetwork 10 must forward the packet using the subnetwork.

Those skilled in the art will recognize that the hosts (22–34) illustrated in FIG. 1 may be coupled to the routers in various manners, such as using direct coupling and physical networks, as well as other connection mechanisms.

Figure 15:
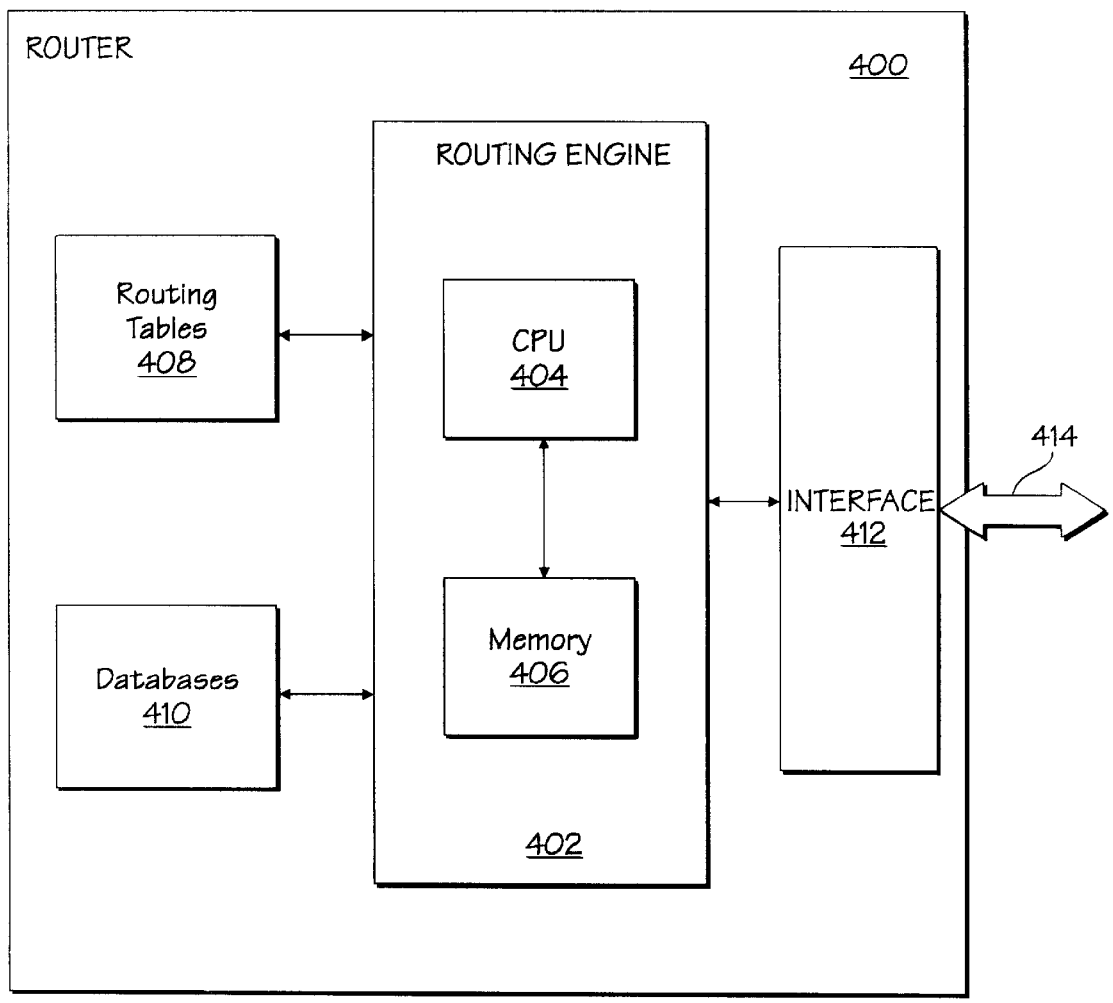
FIG. 15 is a block diagram of a router capable of implementing the teachings of the present invention.

Referring to FIG. 15, a block diagram of a typical router 400 is illustrated. Router 400 is capable of incorporating the teachings of the present invention and includes a routing engine 402 having a CPU 404 and a memory device 406. Routing engine 402 is coupled to various routing tables 408 and databases 410 capable of storing information necessary for router 400 to properly forward packets toward their destination. Databases 410 may include a Link State Database, a PATHS Database, a TENT Database, and a Forwarding Database. An interface 412 is coupled to routing engine 402 and provides the physical connection to a network 414. Those skilled in the art will appreciate that various types of routers may be used with the invention described herein.

Figure 2A:
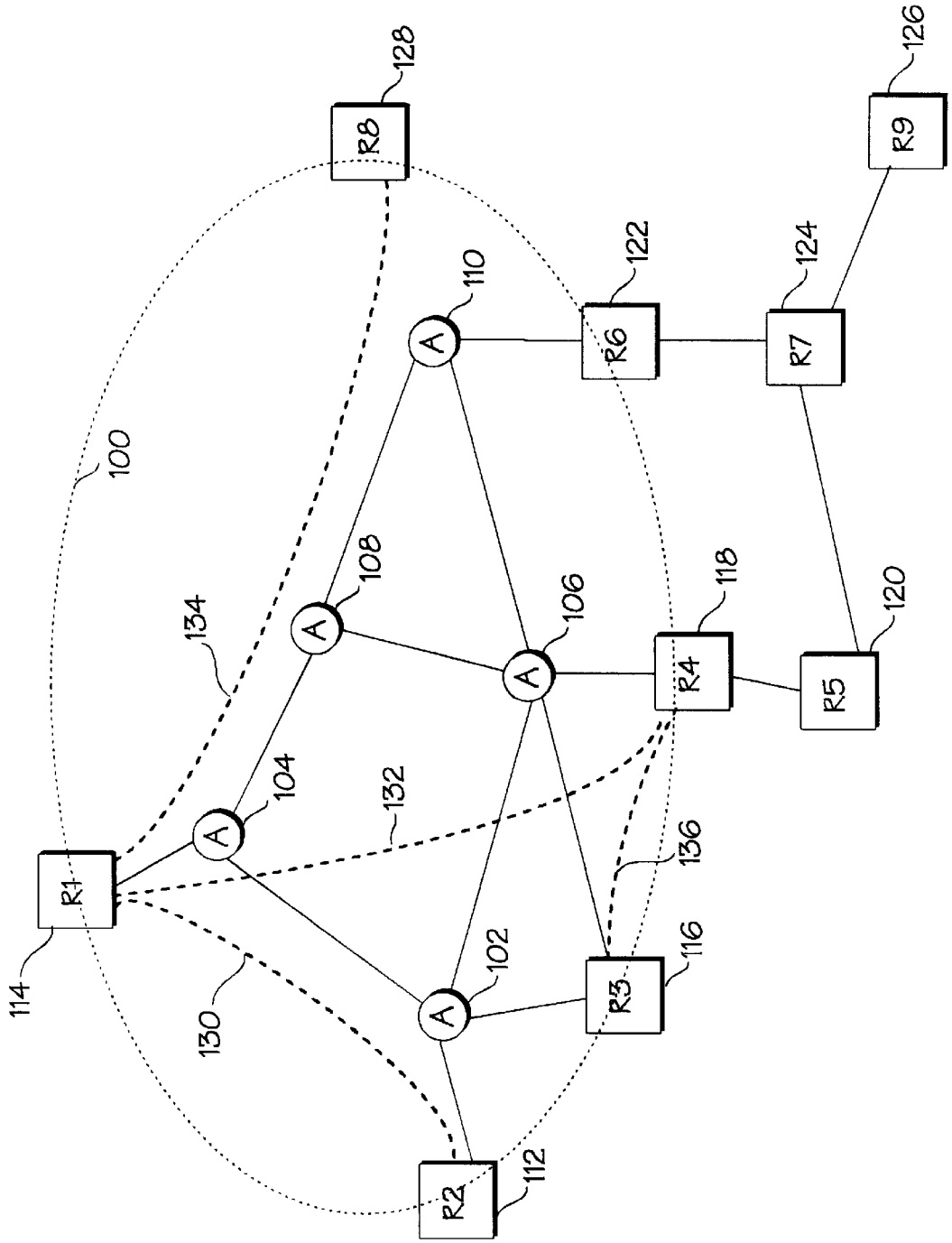
FIGS. 2A and 2B are diagrams of network configurations having multiple routers connected to an ATM subnetwork.

FIG. 2A illustrates a diagram of a simple network configuration having multiple routers connected to an ATM subnetwork. To simplify the diagram, host devices and their connections are not shown. As discussed above, an ATM subnetwork is one example of a connection-oriented subnetwork with which the invention may be practiced.

The configuration illustrated in FIG. 2A includes an ATM subnetwork 100 having five ATM switches (102, 104, 106, 108, and 110) linked together as shown. Six routers (112, 114, 116, 118, 122, and 128) are connected directly to ATM subnetwork 100. Routers 120, 124, and 126 are not connected directly to subnetwork 100, but are coupled to routers capable of forwarding packets over the subnetwork. For example, router 120 can forward a packet via router 118 if the packet is destined for a router across ATM subnetwork 100. Similarly, router 126 can forward packets via router 124 and router 122 to reach subnetwork 100. The configuration of FIG. 2A also includes four virtual circuits (130, 132, 134, and 136) established across subnetwork 100. Virtual circuit 130 connects routers 112 and 114, circuit 132 connects routers 114 and 118, circuit 134 connects routers 114 and 128, and circuit 136 connects routers 116 and 118. Throughout the description of the invention, the term "virtual circuit" is used to denote switched virtual circuits (SVCs) as well as permanent virtual circuits (PVCs).

Each ATM switch in ATM subnetwork 100 maintains the state of all other ATM switches in the subnetwork based on information exchanged using a link state or topology state routing protocol. In one embodiment of the present invention, the state information is exchanged using the ATM Forum standard Private Network to Network Interface (PNNI) routing protocol.

Each router maintains the state of all other routers and ATM switches on the network based on information received from the routing protocol. In one embodiment, state information is received in Integrated PNNI (I-PNNI) Topology State Packets (PTSPs) and consists of the required information which is advertised in I-PNNI PTSPs.

Since only four virtual circuits are provided in the configuration of FIG. 2A, all possible paths across subnetwork 100 are not available. For example, if router 112 has a packet to be delivered to a host attached to router 122, no virtual circuit is available for routing the packet. In this case, a new virtual circuit must be established for routing the packet. However, if router 112 has a packet for delivery to a host connected to router 114, then virtual circuit 130 may be used to forward the packet. In another situation, if router 120 has a packet for delivery to a host attached to router 114, the packet may be forwarded to router 118 and then to router 114 using virtual circuit 132.

In the situation where router 114 has a packet for delivery to a host attached to router 116, a path exists between the two routers, but two different virtual circuits 132 and 136 must be used. Using the roundabout routing method, the packet will automatically be forwarded to router 118 using virtual circuit 132 and then to router 116 using virtual circuit 136. The roundabout method does not consider establishing a new virtual circuit directly between routers 114 and 116, but instead uses the two existing virtual circuits. In contrast, the shortcut routing method will automatically establish a new virtual circuit between routers 114 and 116 for forwarding the packet across subnetwork 100. The shortcut method does not consider the use of existing virtual circuits 132 and 136.

The management system of the present invention selects paths across the connection-oriented subnetwork by determining whether a virtual circuit already exists which is both "feasible" and "efficient." A virtual circuit is "feasible" for a specified destination if it makes some progress toward the destination and will not loop. A feasible virtual circuit ensures that the packet will be delivered to its destination. A virtual circuit is "efficient" if the circuit moves the packet a specific minimum distance closer to the destination. To be "efficient", a virtual circuit must represent a practical use of the network resources. An inefficient virtual circuit may result in multiple hops across the ATM subnetwork, thereby reducing the overall efficiency of the network. Determining feasibility and efficiency will be described in greater detail below.

Figure 3:
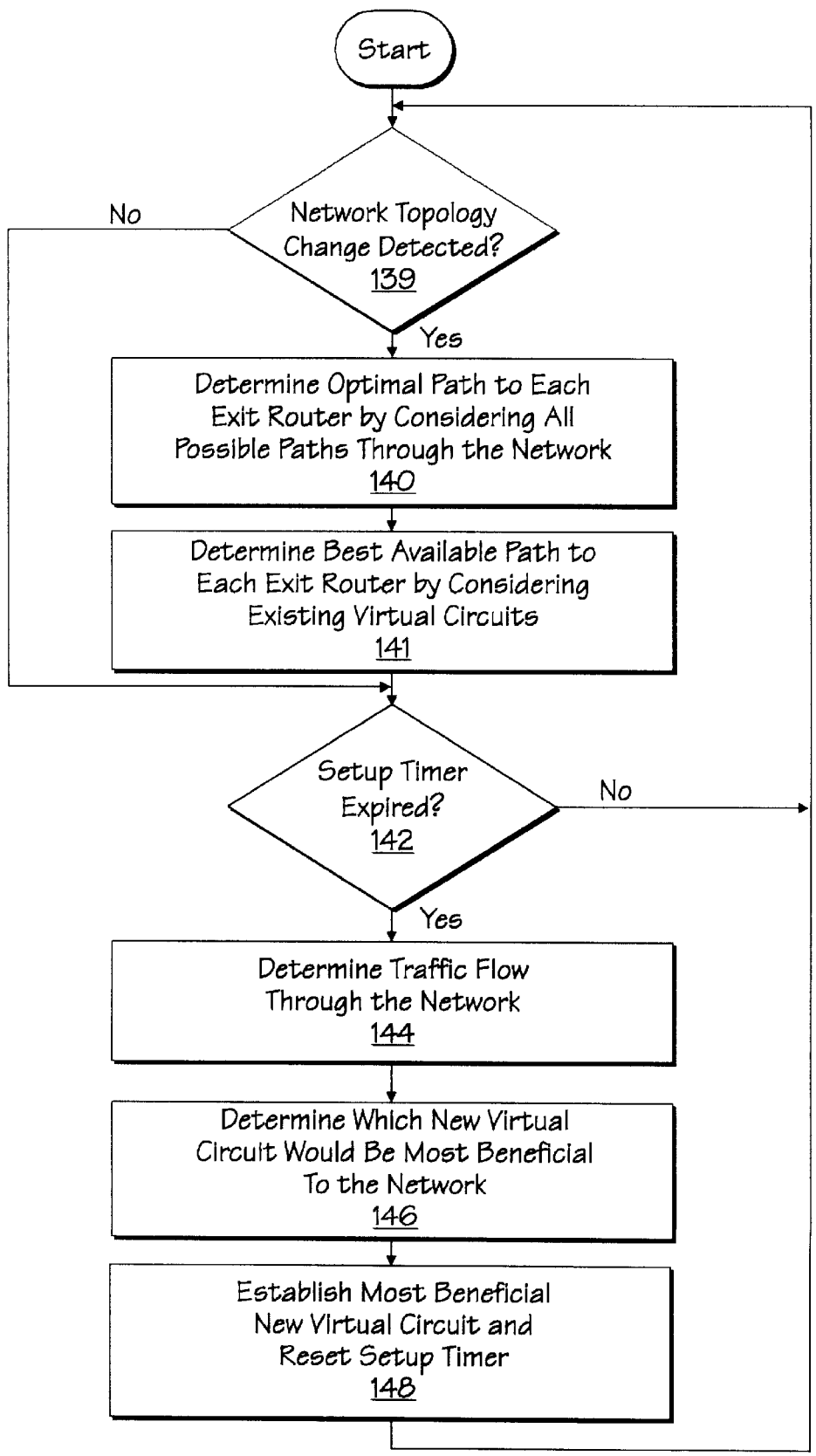
FIG. 3 is a flow diagram illustrating a procedure used to manage and establish new virtual circuits in a network.

FIG. 3 is a flow diagram illustrating a procedure used to manage and establish new virtual circuits in a network. The steps shown in FIG. 3 are preferably executed as a background procedure. The procedure is initiated when a network topology change occurs or during initialization of a router or other network device. Once initiated, the procedure continues as a background procedure to monitor and update virtual circuits in the network.

At step 139 of FIG. 3, the routine determines whether a network topology change has occurred. A network topology change includes the addition, deletion, or rerouting of virtual circuits in the network. Furthermore, the addition of a new router or ATM switch, the addition of a link between a router and a switch, or the initialization of an existing router or switch represents a change in the network topology. If a topology change is detected at step 139, the routine branches to step 140 to determine the optimal path to each exit router by considering all possible paths through the connection-oriented subnetwork. At step 141, the best available path to each exit router is determined by considering only existing virtual circuits. Additional details regarding the determinations performed by steps 140 and 141 are provided below.

From step 141, the routine continues to step 142 to determine whether a virtual circuit setup timer has expired.

Step 142 is also reached from step 139 if a network topology change is not detected. The setup timer referred to in step 142 regulates the rate at which new virtual circuits are established. The operation of the setup timer is discussed in greater detail below with reference to FIG. 8. The use of a timer as illustrated in step 142 is optional. Instead, the establishment of new virtual circuits may be regulated by preventing establishment of a new virtual circuit until the previous virtual circuit has been completely established. If the setup timer has not expired at step 142 (or the previous virtual circuit is not yet established) then the routine returns to step 139 to identify a network topology change. Those skilled in the art will appreciate that other methods may be used to regulate the rate at which new virtual circuits are established.

If the setup timer has expired at step 142, then the routine continues to step 144 to determine traffic flow through various portions of the network. This traffic flow determination identifies congested portions of the network as well as underutilized portions of the network. Step 146 determines which new virtual circuit would be most beneficial to the network; i.e., reduce congestion, shorten paths to destinations, or otherwise improve data flow through the network. Additional details regarding determination of the most beneficial new virtual circuit are provided below with reference to FIG. 7. At step 148, the most beneficial new virtual circuit identified at step 146 is established and the setup timer is reset. The routine then branches to step 139 to identify changes in network topology.

As stated above, the steps illustrated in FIG. 3 are preferably performed as background tasks such that the results are available upon arrival of a packet to be forwarded. The background processing increases the probability that a path will be available when a packet arrives because the necessary calculations and new virtual circuits have already been performed.

In a preferred embodiment, an initial set of virtual circuits is established during initialization of a network or initialization of a network device. This initial set of virtual circuits is established such that a path is available to every destination in the network. These initial paths may not be the optimal paths, but will ensure that an incoming packet may be forwarded to any destination using an existing virtual circuit. After initialization, the background processing illustrated in FIG. 3 will monitor traffic flow through the network and establish new virtual circuits as needed. Additionally, certain virtual circuits may be closed or rerouted to improve network performance as described below.

Figure 4:
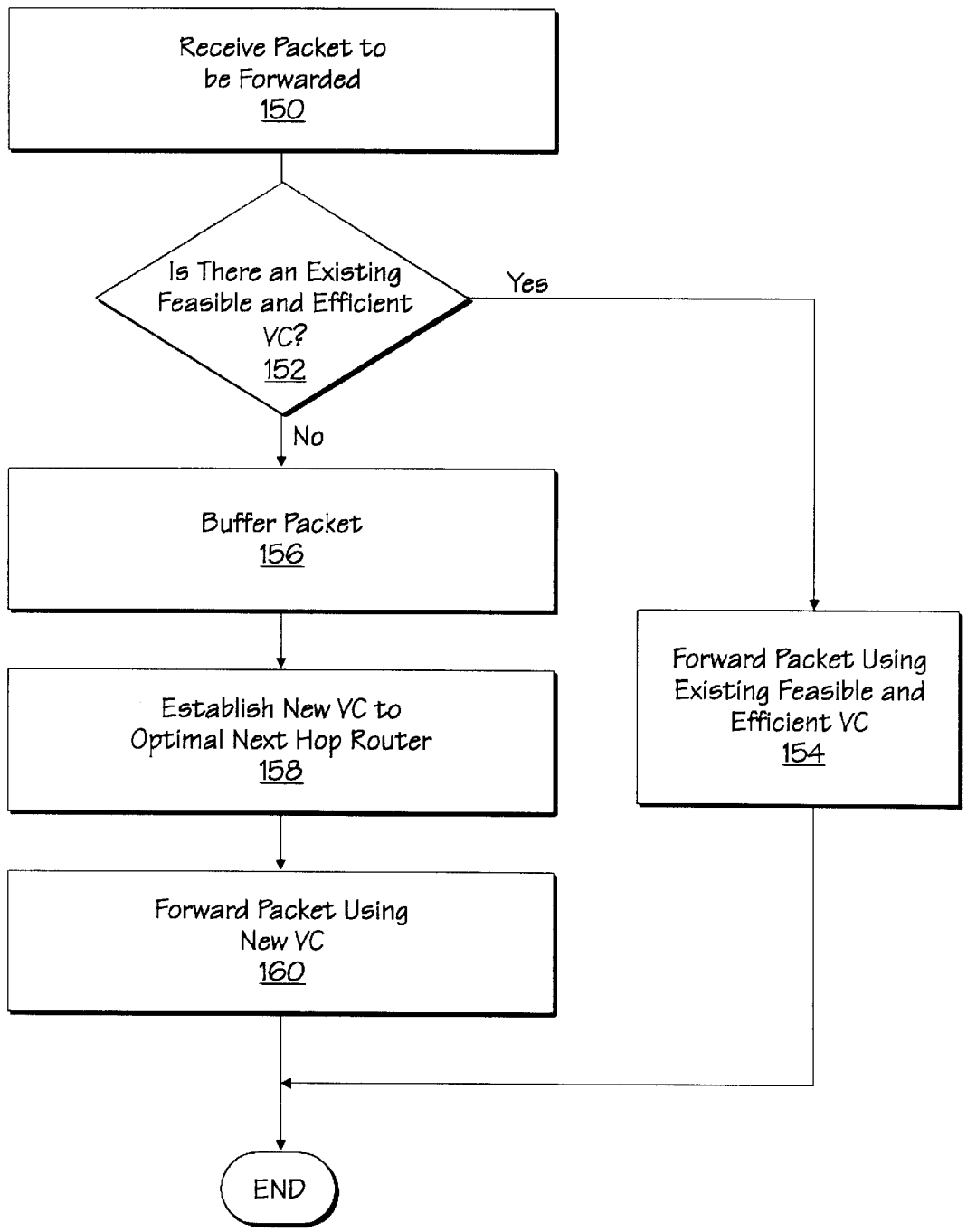
FIG. 4 is a flow diagram illustrating a process for forwarding packets toward their destinations.

Referring to FIG. 4, a flow diagram illustrates the processing of a packet to be forwarded. The packet is received at step 150. Step 152 determines whether an existing and feasible virtual circuit exists for forwarding the packet. The calculations used to determine feasibility and efficiency are described below. Preferably, these feasibility and efficiency calculations are performed as background processing tasks such that the calculation results are immediately available when a packet is received for forwarding. Similarly, the steps shown in FIG. 3 increase the probability that an existing feasible and efficient virtual circuit will already be established to the packet's destination.

If a feasible and efficient virtual circuit exists, then step 154 forwards the packet using the existing feasible and efficient virtual circuit. Otherwise, the packet is buffered at step 156 while a new virtual circuit is established to the optimal next hop router at step 158. Step 160 then forwards the packet using the newly established virtual circuit.

Figure 5A:
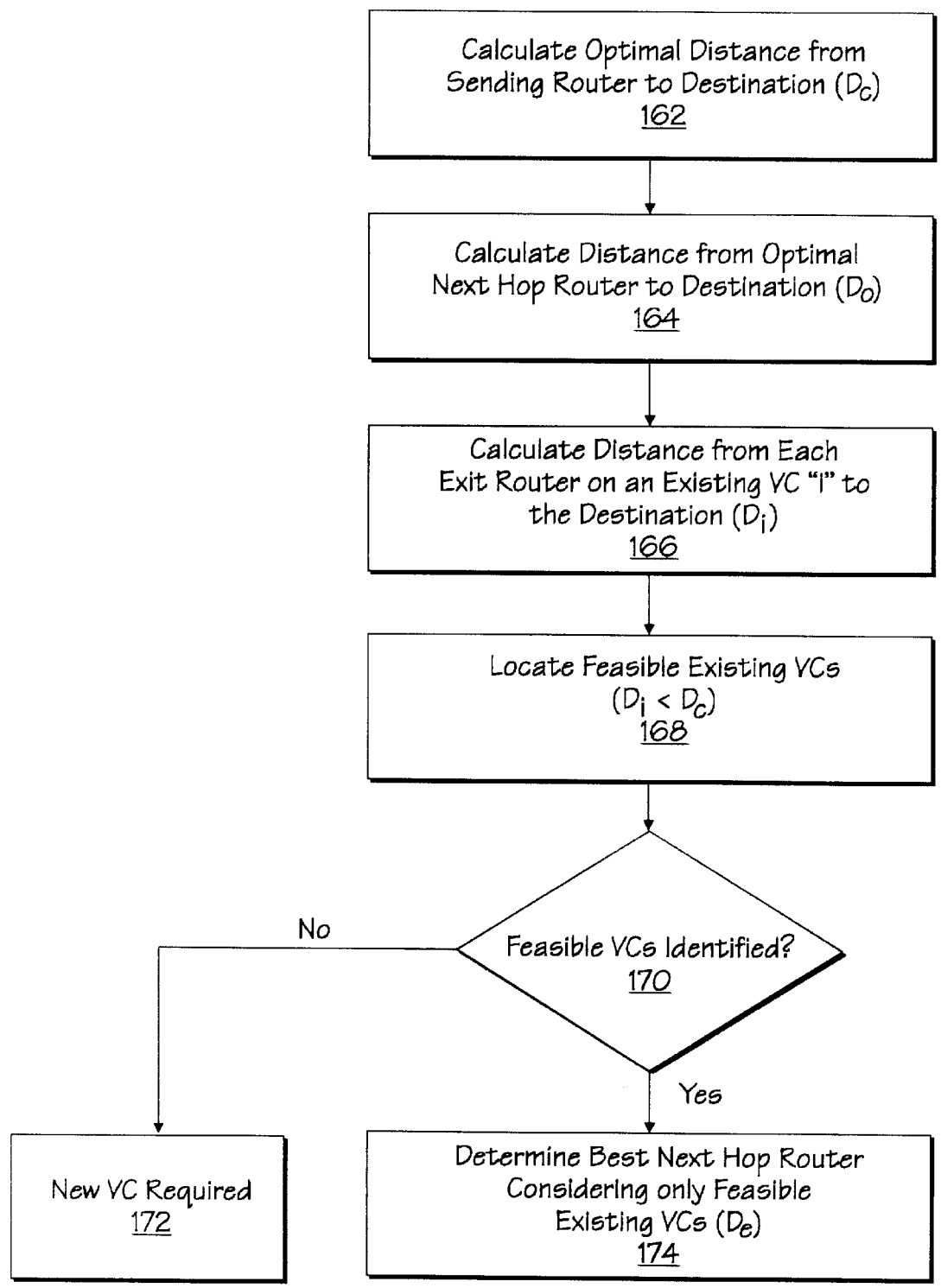
FIGS. 5A and 5B are flow diagrams illustrating calculations and determinations performed by a router in accordance with the present invention.

FIG. 5A is a flow diagram illustrating the calculations performed by a router to determine feasibility of a virtual circuit. At step 162, the sending router first determines the optimal path from the sending router to the destination based on all possible paths. This calculation considers any path across the ATM subnetwork, including virtual circuits which have not yet been established. This optimal path distance is referenced by $D_c$ and may be calculated by running a route computation such as the Dijkstra algorithm to find a path from the current router to the destination. The Dijkstra algorithm is used to calculate the best routes from a particular router to all other routers in the network. Those skilled in the art will be familiar with the implementation of the Dijkstra algorithm. Furthermore, artisans of ordinary skill will understand that other methods may be used to calculate the optimal path distance $D_c$.

Step 164 of FIG. 5A calculates the distance from the optimal next hop router to the destination considering all possible paths and all possible virtual circuits, regardless of whether they currently exist. The distance from the optimal next hop router to the destination is referred to as $D_o$ and is calculated by subtracting the cost of the path, if any, across the immediately adjacent ATM subnetwork from the distance $D_c$. Thus, if the optimal next hop is not across the ATM subnetwork then nothing is subtracted from the distance $D_c$, resulting in $D_o = D_c$.

Steps 166 and 168 of FIG. 5A perform a calculation referred to as the "existing virtual circuits computation" which assumes that packets may be forwarded across the ATM subnetwork using only existing virtual circuits. However, routers located on the other side of the ATM subnetwork may use any possible path, including virtual circuits which have not been established. Step 166 calculates the distance from each exit router on an existing virtual circuit "i" to the destination by executing the Dijkstra algorithm once from each exit router to the destination. The algorithm is used to determine the best path from each exit router to the destination based on any available path. The distance from each exit router on virtual circuit "i" to the destination is referred to as $D_i$.

At step 168, each virtual circuit "i" is analyzed to determine whether it is feasible to the particular destination. A feasible next hop is defined as a hop which moves the packet closer to its destination while avoiding looping of the packet. Using the above calculations, if $D_i \geq D_c$ then the path using virtual circuit "i" is not feasible for the specified destination. Since $D_i$ represents the distance from the exit router to the destination, if $D_i$ is greater than the distance from the source router to the destination using the optimal path then the virtual circuit fails to make any progress toward the destination. If $D_i < D_c$ then the virtual circuit moves the packet closer to its destination and is thus deemed "feasible".

If step 168 did not identify any feasible existing virtual circuits then step 170 branches to step 172, indicating that a new virtual circuit is required to the destination. If at least one feasible existing virtual circuit is identified at step 168, then the routine branches from step 170 to step 174. $D_e$ represents the shortest distance from an exit router on a feasible existing virtual circuit to the destination. Thus, $D_e$ represents the best (i.e., lowest) value of $D_i$.

In the above calculations, if $D_o = D_e$ then the optimal next hop uses an existing virtual circuit. In this situation, the existing virtual circuit is used to forward the packet toward its destination. If $D_o \neq D_e$, then the source router must determine whether the next hop using existing virtual circuits is feasible and efficient for the specified destination. Efficiency is discussed below with reference to FIG. 5B.

The feasibility calculations discussed above may be applied to the example network illustrated in FIG. 2A. The "distance" between any two points in a network environment is commonly referred to as the "cost" assigned to a particular link or series of links. For example, links may be located between two routers, between a router and a connection-oriented subnetwork, or between two switches within a connection-oriented subnetwork.

In FIG. 2A, an example is provided where each link in subnetwork 100 is assigned a cost of 1, and each link between two routers is assigned a cost of 2. If router 114 has a packet for delivery to a host connected to router 126, the optimal path is across subnetwork 100, and via routers 122 and 124. To determine the cost of the optimal path, four links through subnetwork 100 result in a cost of 4. The four links are from router 114 to switch 104, then to switch 108, then to switch 110, and finally to router 122. The two router-to-router links (router 122 to 124, and router 124 to 126) result in a cost of 4. Therefore, the optimal path distance between routers 114 and 124 has a cost of 8, which corresponds to $D_c$. This example is provided to illustrate the assignment of a cost to a particular path in the network. In a larger network, the Dijkstra algorithm may be used to identify the optimal path and the cost of that optimal path. Note, the above calculations ignore the fact that a virtual circuit does not currently exist between routers 114 and 124.

If router 114 has a packet for delivery to a host connected to router 126, the optimal path is via subnetwork 100, and routers 122 and 124. The optimal next hop router is router 122. The distance $D_o$ from router 122 to router 126 is 4 (two links, each having a cost of 2).

If router 114 has a packet for delivery to a host connected to router 126, the only existing path is via virtual circuit 132 and routers 118, 120, and 124. Since a virtual circuit does not exist between routers 114 and 122, $D_i$ is not calculated for the non-existent virtual circuit. In this example, the best (and only) path currently available between routers 114 and 126 is via virtual circuit 132. The distance for $D_i$ and $D_e$ in this example is 6 (three router-to-router links).

Based on the example calculations, $D_c=8$, $D_o=4$, $D_i=6$ and $D_e=6$. Therefore, since $D_o \ne D_e$ the optimal next hop does not use an existing virtual circuit. Furthermore, since $D_e<D_c$, virtual circuit 132 is feasible for routing the packet toward its destination (router 126).

As discussed above, if $D_i=D_c$ then the virtual circuit is not feasible because there is a possibility of looping. An example of this possible looping is shown in FIG. 2B.

Figure 2B:
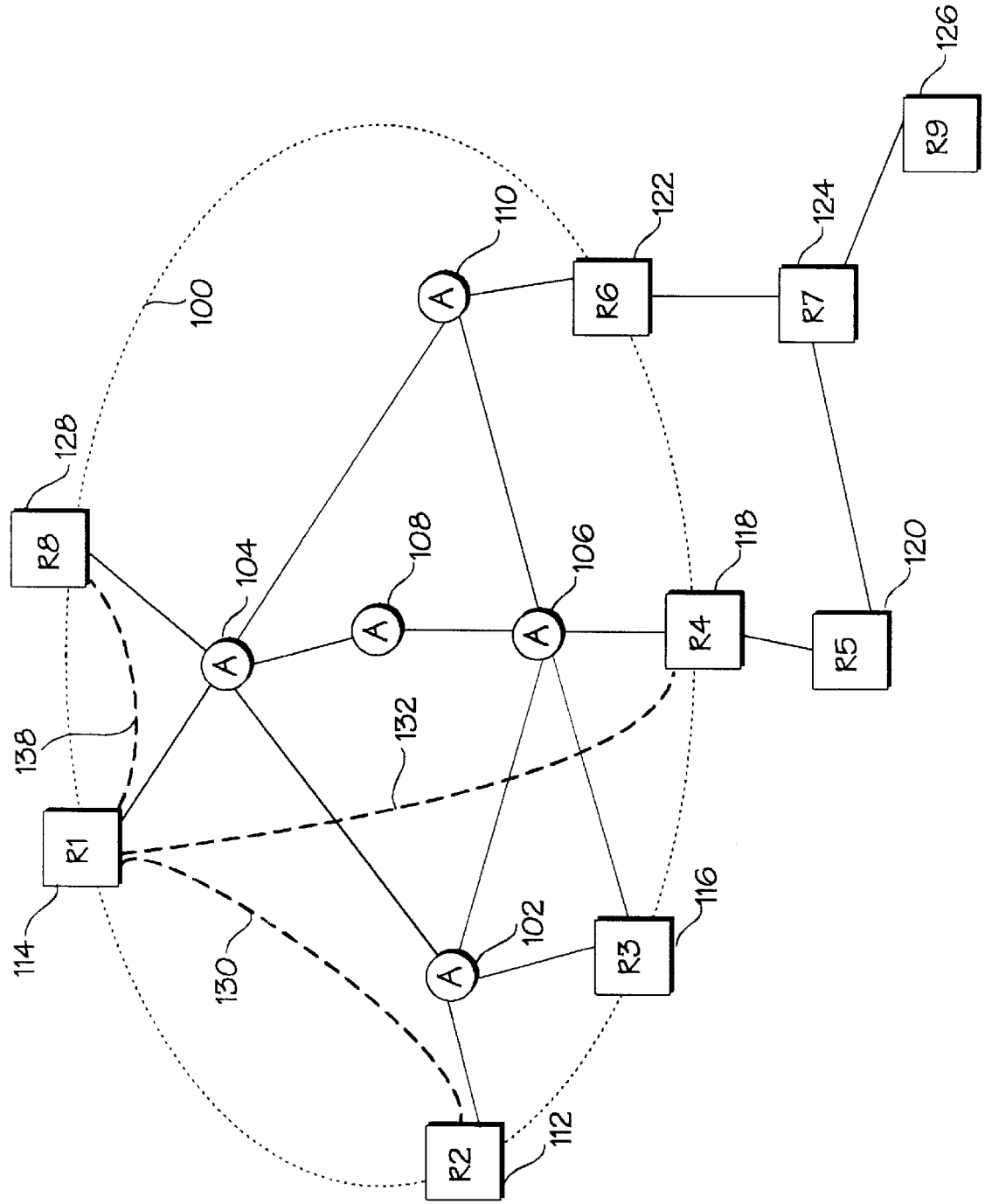

FIG. 2B illustrates a simple network configuration having multiple routers connected to an ATM subnetwork. FIG. 2B is similar to FIG. 2A, but provides a different interconnection among the ATM switches (102–110). As with FIG. 2A above, each link in the ATM subnetwork is assigned a cost of 1 and each router-to-router link is assigned a cost of 2.

If router 114 has a packet to be delivered to router 126, the optimal path is across ATM subnetwork 100 to router 122 and then via router 124. The optimal cost $D_c=7$. Since the virtual circuit between routers 114 and 122 does not exist, router 114 must determine whether to use an existing virtual circuit or establish a new virtual circuit to router 122.

The existing virtual circuits calculation, discussed above, calculates paths assuming that the first hop from router 114 uses an existing virtual circuit. Therefore, the first hop can be to router 112, router 118 or router 128. The cost from router 114 to router 126 using virtual circuit 130 is 11 (virtual circuit 130 has cost 3, and router 112 to router 126 via router 122 has cost 8). Using router 118, the cost to router 126 is 10 (virtual circuit 132 has cost 4, and router 118 to router 126 has cost 6). Using router 128, the cost to router 126 is 9 (virtual circuit 138 has cost 2, and router 114 to router 126 via router 122 has cost 7).

Therefore, based on the existing virtual circuits calculation, the path using router 128, having cost 9, may initially be selected as the best existing virtual circuit, based on the lowest cost. However, the cost from router 114 to router 126 (using the all possible routes calculation) is equal to the cost from router 128 to router 126 (using the existing virtual circuits calculation). Therefore, since $D_c=D_i$, virtual circuit 138, which was initially selected as the best existing virtual circuit, is not feasible. Virtual circuit 138 is not feasible because when the packet reaches router 128, the above calculations will be performed again and possibly cause router 128 to forward the packet back to router 114, therefore creating a loop. Since virtual circuit 138 is not feasible, another existing virtual circuit will be selected and analyzed for feasibility.

The above calculations determine whether a particular virtual circuit is feasible; i.e., whether it makes progress toward the destination and avoids the possibility of looping. However, it may be undesirable to use a feasible existing virtual circuit if the router on the other side of the ATM subnetwork is only slightly closer to the destination. Using such a virtual circuit may result in multiple hops across the ATM subnetwork, causing inefficient operation of the network. Therefore, an embodiment of the present invention provides for specifying a minimum progress toward the destination which must be accomplished by the virtual circuit to be considered "efficient."

Figure 5B:
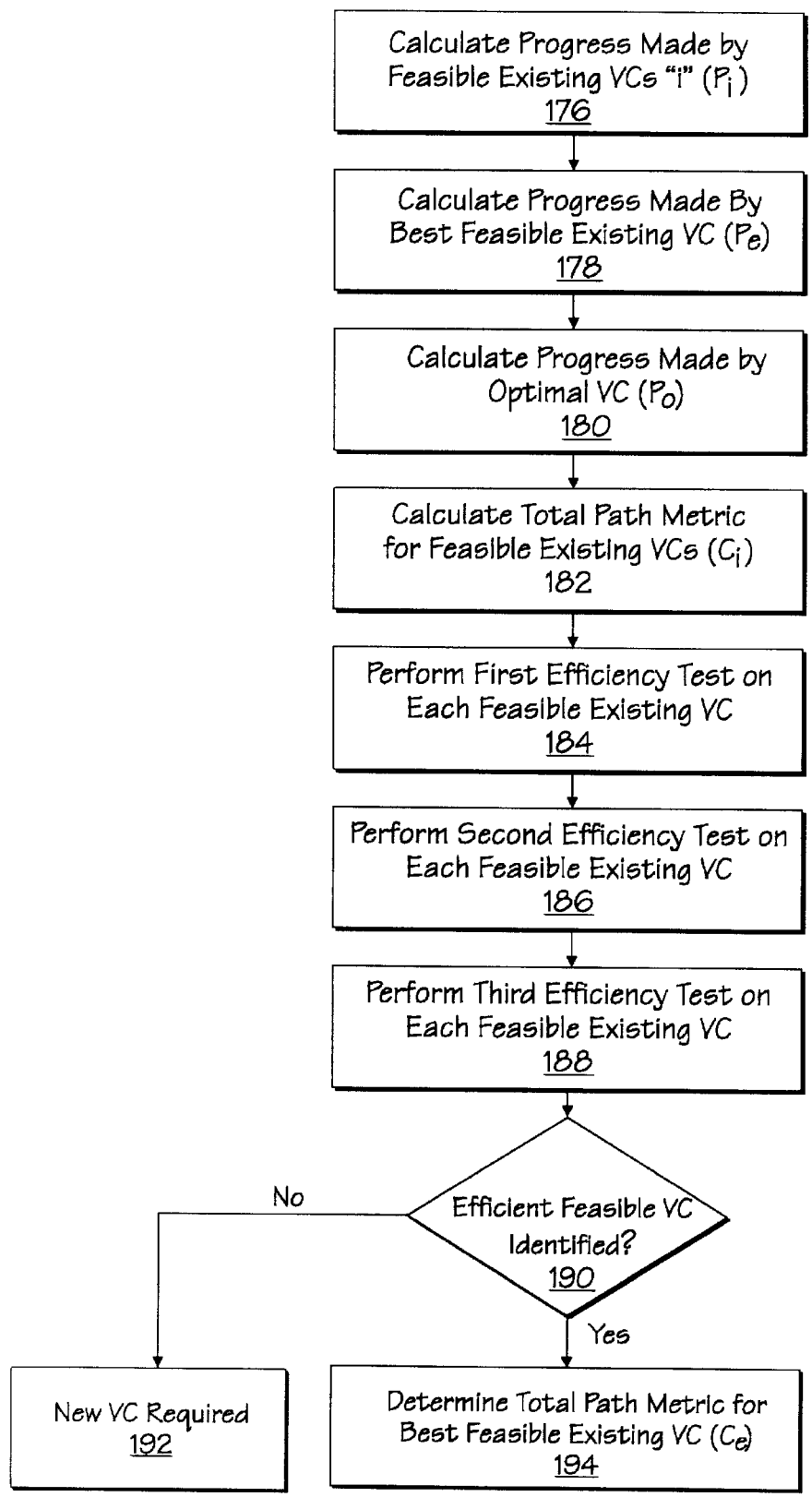

FIG. 5B is a flow diagram illustrating the calculations performed to determine the efficiency of virtual circuits. Step 176 determines the progress, $P_i$, made toward the destination by each feasible existing virtual circuit "i". A calculation is performed at step 178 to determine the progress made by the best feasible existing virtual circuit, represented by $P_e$. Thus, $P_e$ represents the best (i.e., largest) value of $P_i$. Since a virtual circuit can move closer to the destination or move away from the destination, $P_e$ may be positive or negative. $P_e$ is defined by the equation $P_e=D_c-D_e$.

In step 180 of FIG. 5B, $P_o$ represents the progress made by the optimal virtual circuit; i.e., the virtual circuit used if all possible virtual circuits are available. $P_o$ is represented by the equation $P_o=D_c-D_o$.

Each virtual circuit has a particular cost associated with traversing the circuit. The total path metric for each feasible existing virtual circuit "i" is calculated at step 182 and referenced by $C_i$. $C_i$ is calculated as the sum of all of the metrics of each component the virtual circuit crosses.

Three different efficiency tests may be used to determine whether a feasible existing virtual circuit is efficient. At step 184, the first efficiency test may require that the progress made by the feasible existing virtual circuit, $P_i$, be at least some fraction "k" of the progress made by the optimal virtual circuit, $P_o$. The fraction "k" is defined by 0<k<1. This first efficiency test is represented by the equation $P_i \geq k \cdot P_o$.

A second efficiency test, step 186, may require that an existing virtual circuit, $P_i$, make some minimum progress, defined by $P_{min}$, toward the destination. If the minimum progress is not achieved by $P_i$, the second efficiency test fails. The second efficiency test is represented by the equation $P_i \geq P_{min}$.

A third efficiency test, step 188, may require that the progress made by crossing the existing virtual circuit is at least a minimum fraction r of the cost associated with traversing the existing virtual circuit ($C_i$). This requirement is represented by the equation $P_i \geq r \cdot C_i$.

The values of k, r, and $P_{min}$ may be configured by the network operator or administrator. Additionally, default values may be provided for k, r, and $P_{min}$ which are used in the absence of values provided by the network operator or administrator.

If an efficient virtual circuit fails any one of the efficiency tests in FIG. 5B, then the virtual circuit is not efficient. At step 190, if all virtual circuits fail one or more of the efficiency tests, then the routine branches to block 192, indicating that a new virtual circuit is required. If one or more feasible existing virtual circuits pass all three efficiency tests, then step 190 branches to step 194 to determine the total path metric, $C_e$, for the best existing virtual circuit which is both feasible and efficient. $C_e$ is calculated in the same manner as $C_i$, described above.

The calculations illustrated in FIG. 5B may be applied to the example network shown in FIG. 2A. In the previous example, router 114 has a packet for delivery to a host connected to router 126. As calculated previously with reference to FIG. 5A, $D_c=8$, $D_o=4$, $D_i=6$ and $D_e=6$. Using these results, $P_o = D_c - D_o = 8 - 4 = 4$, and $P_i = D_c - D_i = 8 - 6 = 2$. Since the optimal virtual circuit makes greater progress, $P_o$, toward the destination than the existing virtual circuit, $P_i$, the next step is to determine whether it is worthwhile to establish the optimal virtual circuit or use an existing, less optimal virtual circuit.

For the first efficiency test, a fraction k=0.4 may be used to indicate that an existing virtual circuit must progress at least 40% of the distance progressed by the optimal virtual circuit. Otherwise, the existing virtual circuit is not considered efficient. In the above example, $k \cdot P_o = 1.6$. Therefore, since $P_i(2)$ is greater than 1.6, the existing virtual circuit satisfies this first efficiency test, $P_i \geq k \cdot P_o$.

In the second efficiency test, $P_{min}$ may be selected as 1.0. This represents the minimum progress a virtual circuit must make to be considered efficient. In this example, the existing virtual circuit must satisfy the equation $P_i > 1.0$. Since $P_i = 2$, the second efficiency test, $P_i \geq P_{min}$, is satisfied.

Regarding the third efficiency test, the total path metric for virtual circuit 132 is 4 ($C_i=4$). If r=0.5 then $r \cdot C_i = 2$. Since $P_i = 2$, the third efficiency test, $P_i \geq r \cdot C_i$, is satisfied.

To summarize the above discussions of feasibility and efficiency, an existing virtual circuit "i" is feasible if $D_i < D_c$. The existing virtual circuit is efficient if each of the following are true: $(P_i \geq k \cdot P_o)$, $(P_i \geq P_{min})$, and $(P_i \geq r \cdot C_i)$.

Therefore, an existing virtual circuit is both feasible and efficient if the following conditions are satisfied:

$(D_i < D_c)$ and $(P_i \geq k \cdot P_o)$ and $(P_i \geq P_{min})$ and $(P_i \geq r \cdot C_i)$.

In FIG. 5B above, three different efficiency tests are described. Those skilled in the art will appreciate that it is not necessary to use all three of the above tests. Instead, a subset of the efficiency tests may be used by any particular router. Furthermore, by altering the values of k, r, and $P_{min}$, one or more of the efficiency tests may be effectively eliminated. For example, if r=0 or k=0, then the equations for the first and third efficiency tests become $P_i \geq 0$. Thus, any positive value for $P_i$, including zero, will satisfy the test. In this manner, all three efficiency tests may be eliminated by setting each of the values k, r, and $P_{min}$ equal to zero.

In accordance with the present invention, the preceding calculations to determine feasibility and efficiency may be performed by an algorithm operating on a router. As illustrated in FIG. 15, router 400 includes routing tables 408 and databases 410 coupled to routing engine 402. This configuration is capable of receiving and storing the parameters necessary to perform the above calculations. Routing engine 402 is capable of performing the previously described calculations. Those skilled in the art will be familiar with various methods and procedures used to implement the above calculations and determinations.

The above calculations regarding feasibility and efficiency may be performed as part of the background processing of the present invention. This background processing provides a high probability that when any particular packet arrives at a router, a feasible and efficient virtual circuit is already available for forwarding the packet. If a feasible and efficient virtual circuit is not already established, then the packet forwarding process is still accelerated because the necessary calculations have already been performed and stored, thereby permitting a quick establishment of the necessary virtual circuit.

Figure 6:
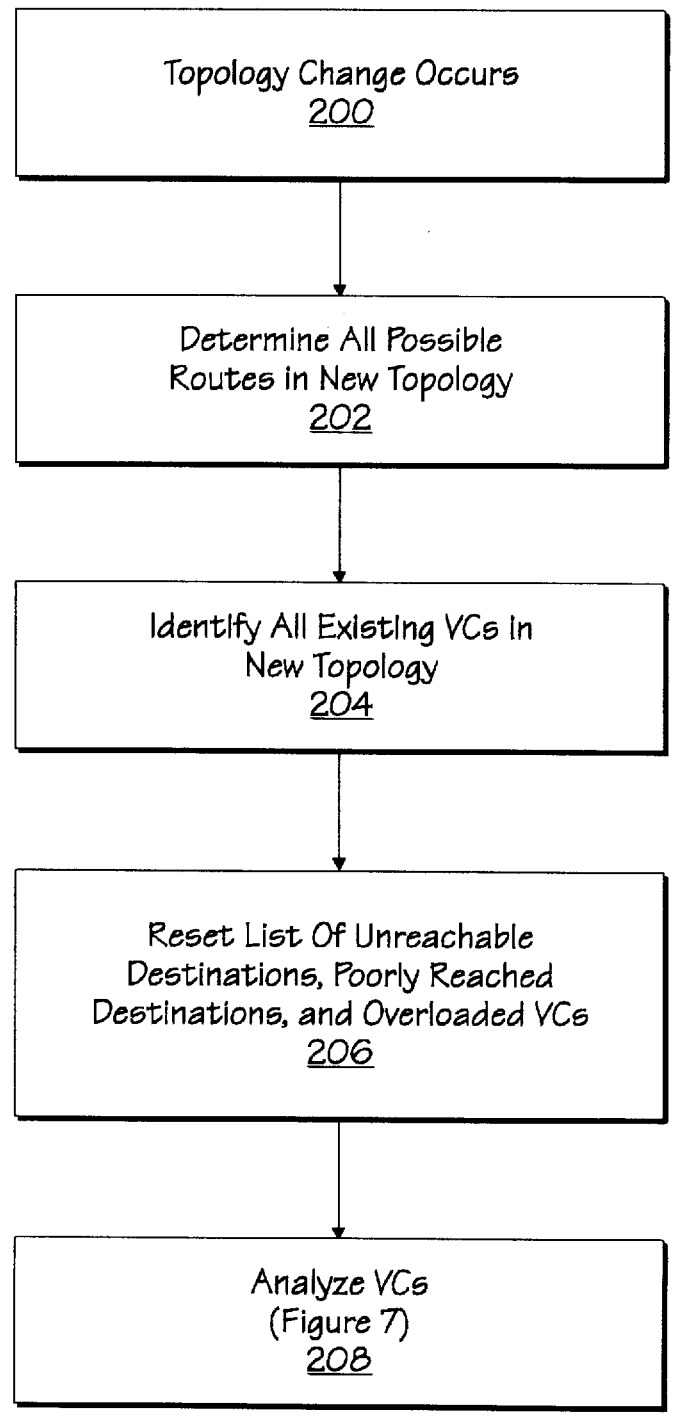
FIG. 6 is a flow diagram illustrating a procedure followed when a network topology change occurs.

Referring to FIG. 6, a flow diagram illustrates a procedure followed when a topology change occurs. FIG. 6 illustrates steps which may be performed in addition to those steps discussed above with respect to FIG. 3. A topology change may be detected by information provided in the link state packets, or events local to the router. Topology changes include establishment of a new virtual circuit, failure or disconnection of a previously established virtual circuit, and the addition or removal of routers or other network devices. Step 200 identifies the occurrence of a network topology change and continues to step 202 where all possible routes through the new network topology are determined. Step 204 then identifies all existing virtual circuits in the new topology. When identifying existing virtual circuits, the feasibility and efficiency of each virtual circuit is considered. Certain routes may become unfeasible or inefficient because a new and better route may have been created. Other routes may become unfeasible or inefficient because an important link no longer exists.

Previous network processing (i.e., prior to the topology change) may have identified certain unreachable destinations, poorly reached destinations, or overloaded virtual circuits. These identified destinations or circuits may be stored in a list or other format as part of the ongoing network processing, particularly the background processing tasks. When a network topology change occurs, these lists of destinations or circuits must be cleared at step 206 because they are no longer reliable in view of the changed topology. At step 208, the existing virtual circuits are analyzed as discussed below with reference to FIG. 7. The steps performed in FIG. 6 take into consideration any changes in traffic flow as a result of the topology changes. The procedure also determines whether any destinations have become unreachable due to the change in network topology.

Figure 7:
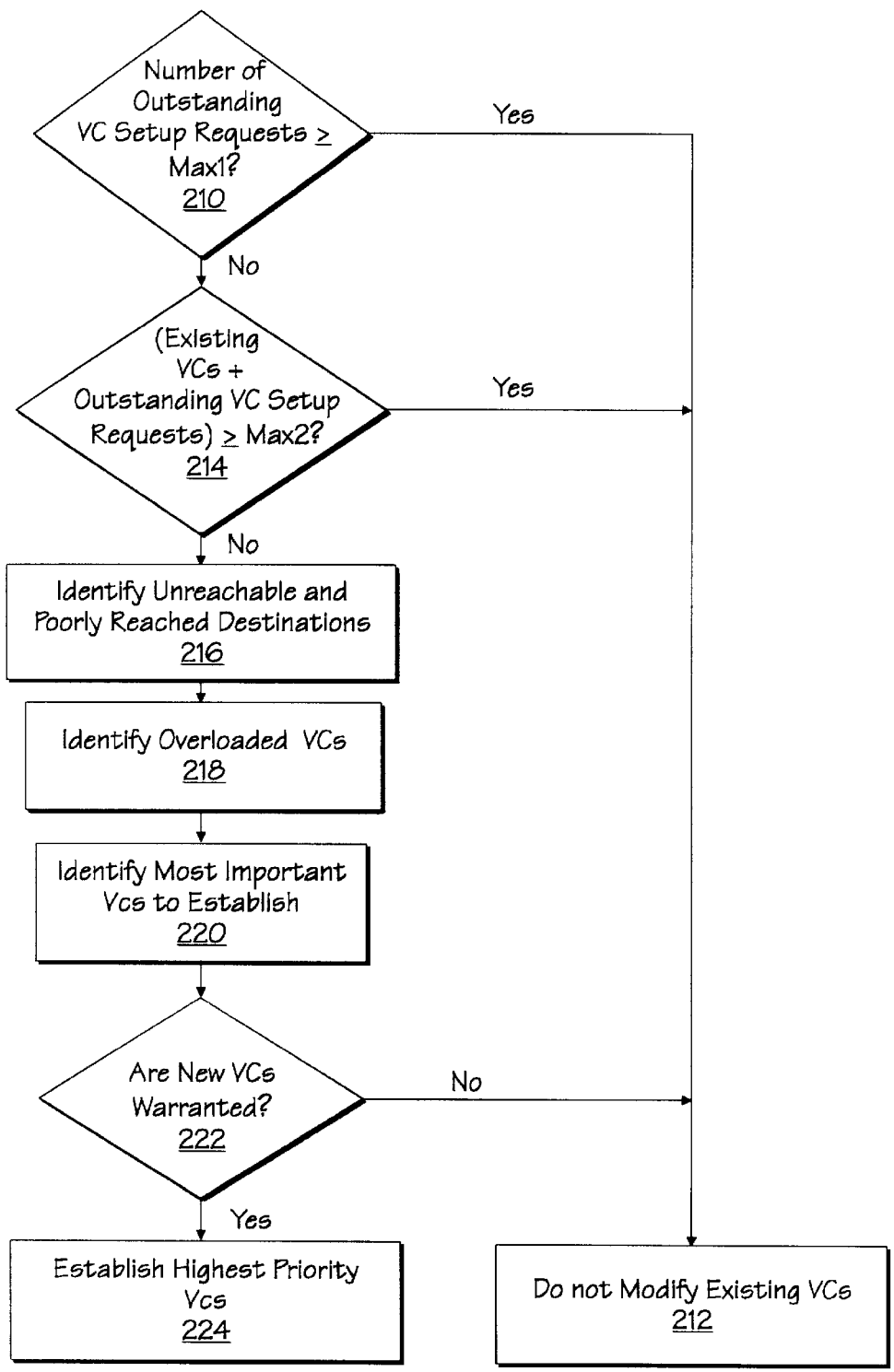
FIG. 7 is a flow diagram showing a procedure for determining whether to establish a new virtual circuit.

FIG. 7 illustrates an existing virtual circuit analysis procedure for determining whether a new virtual circuit should be established. As stated above, this processing is preferably performed as a background task such that the necessary virtual circuits are already established when a packet arrives requiring use of the virtual circuit. Step 210 determines whether the current number of outstanding virtual circuit setup requests exceeds a predetermined maximum value. This maximum value prevents overloading of the system with setup requests and thereby reducing the system resources available for forwarding packets. If the number of outstanding virtual circuit setup requests exceeds the maximum value, then the procedure branches to step 212 without modifying the existing virtual circuits or establishing new virtual circuits.

If the number of outstanding virtual circuit setup requests does not exceed the maximum value at step 210, then step 214 determines whether the sum of the number of existing virtual circuits and the number of outstanding virtual circuit setup requests exceeds a second maximum value. This second maximum value prevents the overloading of system resources with the establishment and maintenance of virtual circuits. If the maximum value is exceeded at step 214, then the procedure branches to step 212 without modifying the existing virtual circuits. If the maximum value is not exceeded, then step 214 continues to step 216 where unreachable and poorly reached destinations are identified. Poorly reached destinations are those in which the path using existing virtual circuits is substantially worse than the optimal path considering all possible virtual circuits. At step 218, overloaded virtual circuits are identified using data traffic statistics between particular destinations. Overall network efficiency may be enhanced by establishing a new virtual circuit to reduce traffic flow across an overloaded virtual circuit.

At step 220 of FIG. 7, the most important virtual circuits not yet established are identified. These virtual circuits may represent currently unreachable destinations or destinations with heavy traffic flow and a poorly routed existing virtual circuit. In particular, network traffic is measured through each known ATM exit router. It is difficult to accurately estimate the value of a potential new virtual circuit without knowledge of the traffic load on the network. A good estimate of future network traffic flow can be obtained by measuring recent network traffic. Each router attached to the ATM subnetwork maintains a count of the number of packets it has received with a destination address reachable by other routers in the network. This traffic count may be measured using a variety of methods. The count may be taken during a specific time period and used to estimate traffic flow during subsequent time periods. Alternatively, the count may be measured using a running average; i.e., periodically reducing the value of the count by a specified fraction such that the most recent traffic is given a greater weight than past traffic. Additional methods capable of measuring traffic flow will be known to those skilled in the networking art.

Step 222 of FIG. 7 determines whether the current status of the network warrants establishment of a new virtual circuit. This determination involves a balancing of the current level of network state information and the quality of the existing paths, including the feasibility and efficiency of existing virtual circuits. Also included in this balancing is the magnitude of the improvement in the paths to particular destinations if one or more new virtual circuits are established. Those skilled in the art will appreciate that various network environments and requirements will provide different results to the determination in step 222. If new virtual circuits are not warranted, the procedure branches to step 212 without modifying the existing virtual circuits. If the determination at step 222 indicates that one or more new virtual circuits are warranted, then the highest priority virtual circuits (identified in step 220) are established at step 224.

In an alternate embodiment, instead of establishing the new path at step 224, the system may store information regarding the path to be established if a packet is received for the particular destination. Thus, when a packet is received, the path is established based on the calculations which have already been performed and stored. This saves processing time when the packet is received, and saves processing time in the background procedure by not establishing a new path until it is needed.

The procedure illustrated above in FIG. 7 provides incremental alterations to the virtual circuits in the network. Rather than altering a large number of virtual circuits in a single operation, a smaller number of virtual circuits are altered between packet forwarding operations. This incremental approach distributes the calculations associated with virtual circuit adjustments, and prevents a large accumulation of packets awaiting forwarding while the virtual circuit adjustments are performed. Finally, the incremental approach provides a gradual and continuous adjustment of the virtual circuits to meet the changing requirements of the network.

Although an incremental adjustment procedure has been described and illustrated herein, those skilled in the art will appreciate that a larger number of virtual circuits may be adjusted in a particular operation depending on the requirements of the network. The calculations and determinations in a larger operation are similar to those discussed above and utilize similar procedures and considerations.

Although it is important to provide high quality paths to each destination in the network, a virtual circuit management system cannot utilize all computational resources to continually establish the optimal set of paths. Therefore, the background processing tasks must be limited to a reasonable portion of the overall system resources. Thus, the background processing procedures provide the best possible paths based on the time available for the background processing. The paths provided by the management system are not necessarily the optimal set of paths for the particular network configuration.

Figure 8:
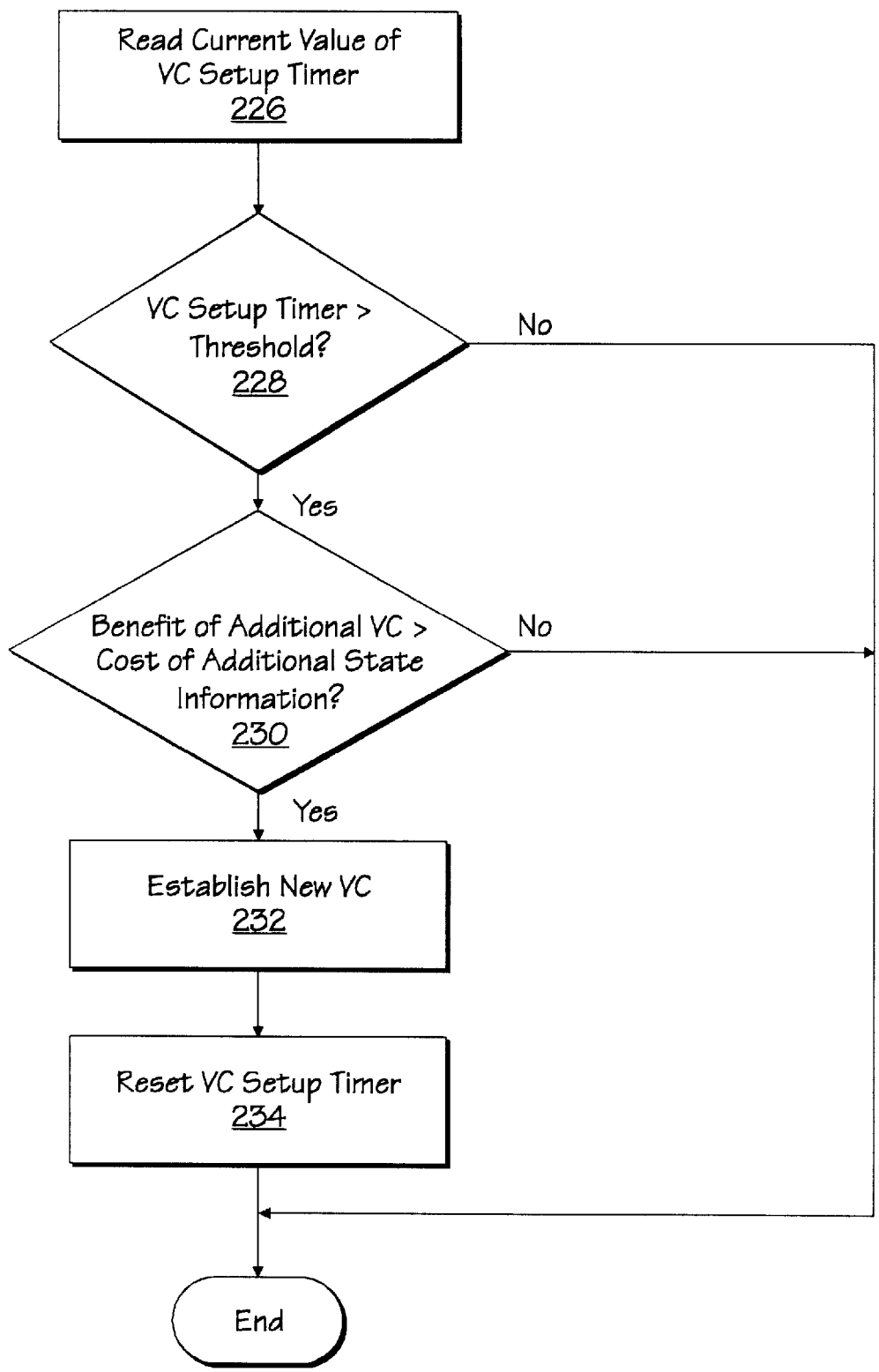
FIG. 8 is a flow diagram illustrating another procedure for determining whether to establish a new virtual circuit.

Referring to FIG. 8, a flow diagram illustrates another procedure for determining whether to establish a new virtual circuit. This procedure utilizes a timer to control the frequency at which new virtual circuits are established. The timer may be used in conjunction with the procedure described in FIG. 7 (for example, to determine whether new virtual circuits are warranted (step 222)). At step 226 of FIG. 8, the routine determines the current value of a virtual circuit setup timer. This setup timer establishes a limit on the rate at which new virtual circuits are established. For example, every "x" milliseconds a new virtual circuit may be established, if necessary. This limit on new virtual circuits is important to avoid overloading the call setup capabilities of the network. Routers can typically handle several orders of magnitude greater numbers of packets than the number of call setup requests handled by ATM switches. Therefore, a setup timer is used to limit the establishment of new virtual circuits.

At step 228, the routine determines whether the virtual circuit setup timer has exceeded a predetermined threshold value. If the setup timer is less than the threshold value, then a sufficient time period has not passed since the last virtual circuit was established, and the routine does not establish the requested new virtual circuit.

If a sufficient time period has passed at step 228, then step 230 determines whether the value of adding the additional virtual circuit outweighs the cost of the additional state information required to indicate the existence of the new virtual circuit. As part of the determination in step 230, the routine performs a "potential virtual circuits" computation. This computation is similar to the "existing virtual circuits" computation with the addition of the proposed new virtual circuit. This represents the addition of a single new "link" to an existing topology for which the route computation has already been performed. Thus, the potential virtual circuits computation consists of a single Dijkstra computation, then an incremental "delta" computation is performed. Therefore, it is unnecessary to perform multiple Dijkstras from every exit router.

The potential virtual circuits computation determines which other routers in the network would be reached with the new virtual circuit. The path cost to the destination using the new virtual circuit is then compared to the previous cost calculated using the existing virtual circuits calculation. The value of the improved path is calculated as follows:

Value=Reduction in cost to each router·Traffic for that router

The potential virtual circuits computation determines the costs and benefits of the new virtual circuit on the congestion of the ATM subnetwork by considering both the increased congestion along the new virtual circuit and the reduced congestion resulting from lower traffic levels on other virtual circuits. This comparison of costs and benefits requires comparing dissimilar quantities. Thus, Lagrange multipliers are utilized to compare the costs and benefits. Lagrange multipliers consist of using a linear cost coefficient which can be multiplied to each cost and benefit measure in order to make them comparable. Additionally, different values may be used for the Lagrange multipliers associated with resources which are in short supply (close to being exhausted) relative to resources which are relatively abundant. The use of Lagrange multipliers may be extended to allow non-linear cost functions. For example, the cost of depleting a resource will increase as the resource approaches exhaustion.

Referring still to FIG. 8, if the value of the additional virtual circuit does not outweigh the cost of the additional state information at step 230, then the new virtual circuit is not established. Otherwise, step 230 branches to step 232 where a new virtual circuit is established, and continues to step 234 where the virtual circuit setup timer is reset, thereby preventing establishment of another new virtual circuit for the time period specified by the threshold value.

Figure 9:
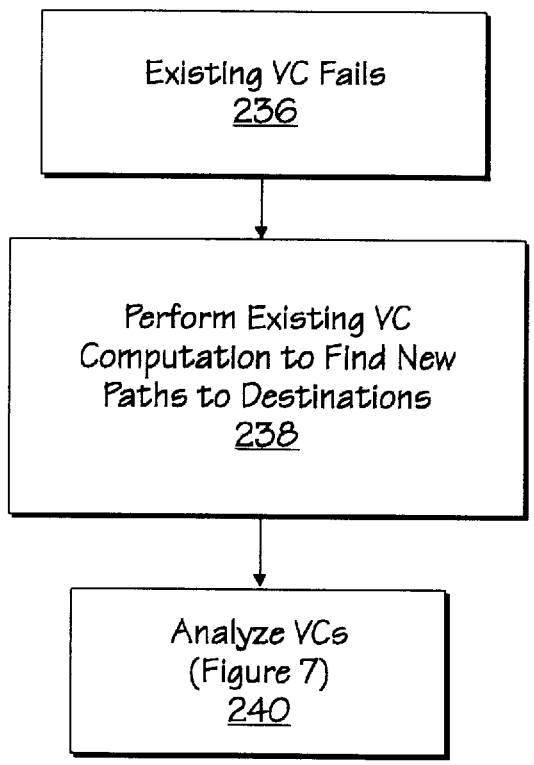
FIG. 9 is a flow diagram showing a method for handling the failure of an existing virtual circuit.

Referring to FIG. 9, if an existing virtual circuit fails (step 236), then the existing virtual circuit computation is performed at step 238. This computation identifies new paths to those destinations which were previously reached using the failed virtual circuit. The new paths may be identified using an incremental computation by first marking as unreachable the nodes which had been reachable over the failed virtual circuit. Each of the unreachable nodes is analyzed to determine whether they had any reachable neighbors, and if so are added to the TENT database with the best available distance to the neighbor. The best node in the TENT database is then added to the PATHS database. The nodes which remain reachable (i.e., not affected by the failed virtual circuit) are already considered to be in the PATHS database and are not added to the TENT database. Destinations which had been reached by the failed virtual circuit are considered for possible addition to the list of unreachable destinations or the list of poorly reached destinations, discussed above. Additionally, the list of overloaded virtual circuits is recalculated in light of the failed virtual circuit. Finally, the remaining virtual circuits are analyzed at step 240 using the procedure described above in FIG. 7.

Figure 10:
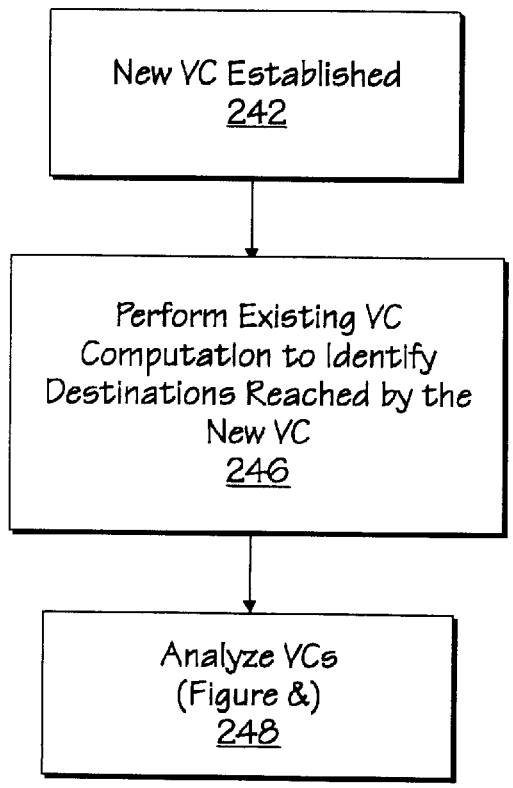
FIG. 10 is a flow diagram illustrating a procedure followed when a new virtual circuit is established.

FIG. 10 illustrates the procedure followed when a new virtual circuit is established (step 242). At step 246, the existing virtual circuit computation is performed to identify destinations which are reached by the new virtual circuit. This existing virtual circuit computation is performed using an incremental Dijkstra computation. The incremental Dijkstra computation is performed when a previous Dijkstra computation has already been completed, and the only change to the network topology is the addition of one or more links from one network node (S) to newly adjacent network nodes (W). The PATHS database is initialized to contain the paths that were found in the previous Dijkstra computation. For each node W, the new path to W using the link from S to W is compared with the existing path from the PATHS database. If the new path is better, then the old path is removed from PATHS, and node W and the associated path is added to the TENT database.

At each step of the incremental Dijkstra computation, the node U in TENT which is closest to S is moved from TENT to PATHS along with the associated path to U. For each node V which is adjacent to node U, the path from S to U to V is compared with the existing path, if any, to V which may be stored in either TENT or PATHS. If the new path is better, then the old path is removed from either TENT or PATHS and the new path is added to TENT. This procedure is repeated until the TENT database is empty, indicating that the PATHS database is complete.

Figure 11:
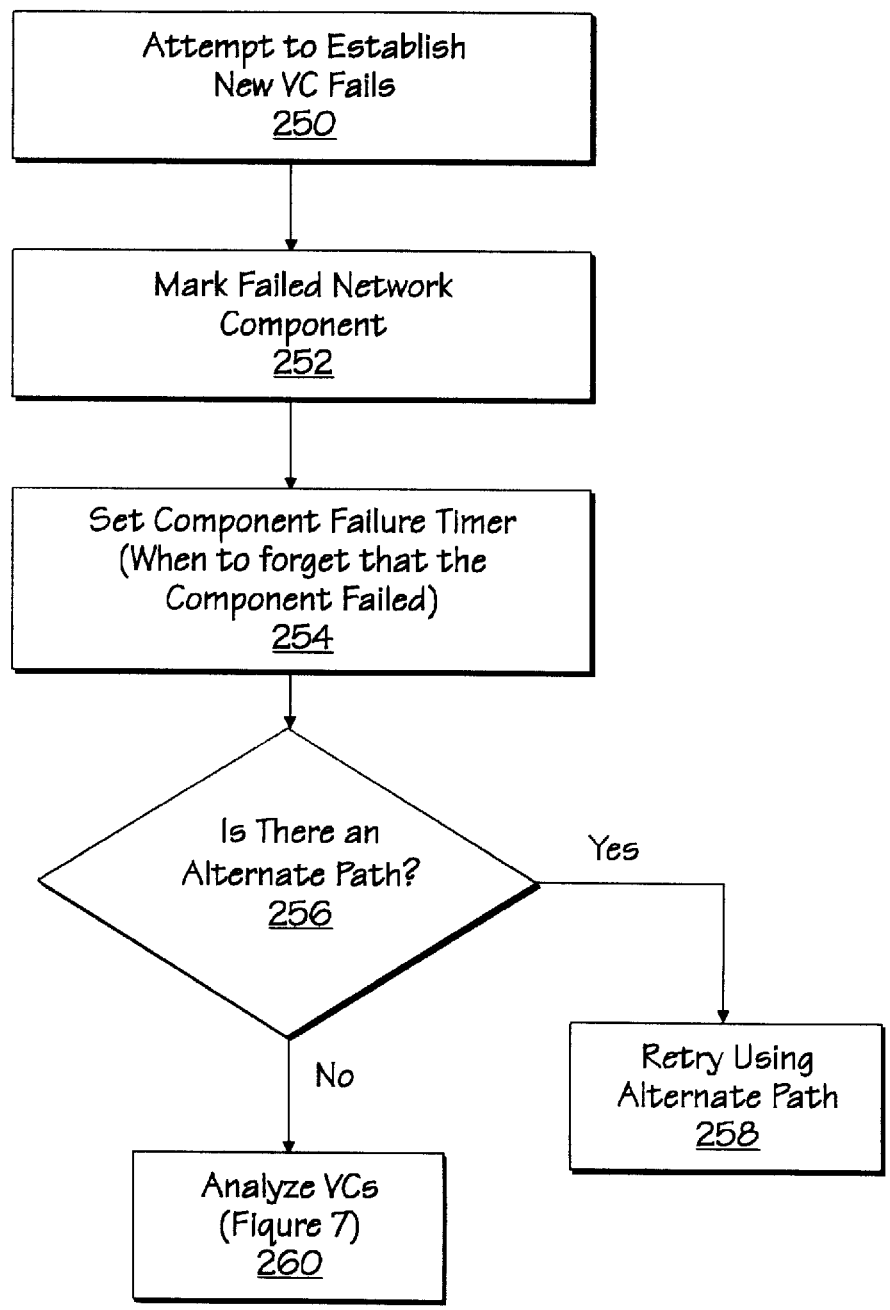
FIG. 11 is a flow diagram showing a method for handling the failure of an attempt to establish a new virtual circuit.

Referring to FIG. 11, a procedure is illustrated for handling the failure of an attempt to establish a new virtual circuit (step 250). At step 252, the failed network component is marked and a component failure timer is set at step 254. Marking the failed network component may consist of setting a flag associated with the failed component. The component failure timer indicates when to ignore the fact that the component failed. It is assumed that if failure persists, then before the timer expires, additional information will have been received regarding the failure through the link state routing protocol. When the component failure timer expires, the flag marking the failed component is cleared and the status of the component returns to the most recent link state update.

At step 256 in FIG. 11, a determination is made regarding whether an alternate path exists to the desired destination. If an alternate path exists, then step 258 attempts to establish a new virtual circuit to the destination using the alternate path. If an alternate path is not identified, then step 260 analyzes the virtual circuits (as described with respect to FIG. 7) to determine whether another virtual circuit should be established.

Figure 12:
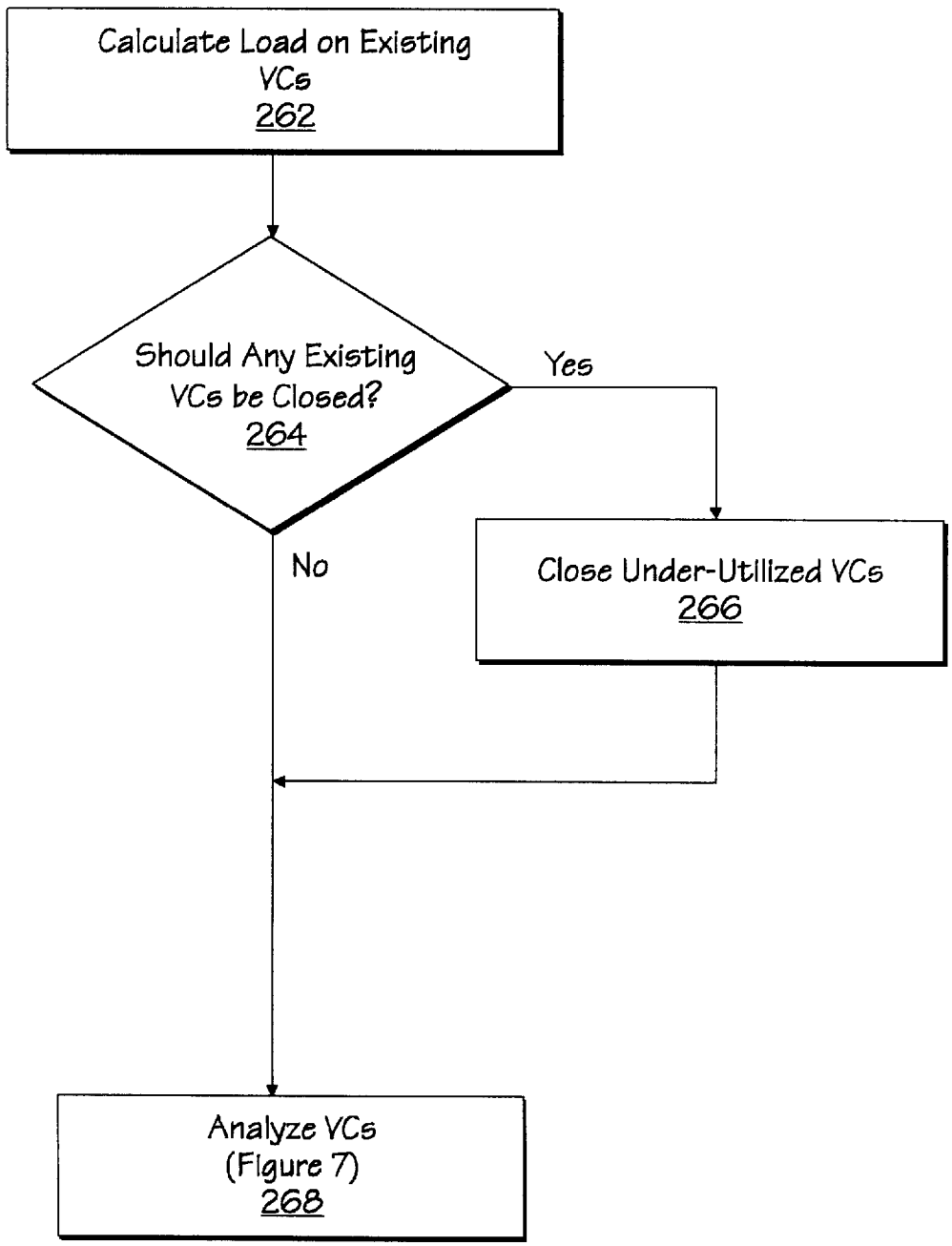
FIG. 12 is a flow diagram showing a procedure for determining whether certain virtual circuits should be closed.

Referring to FIG. 12, a procedure is illustrated for determining whether certain virtual circuits should be closed. At step 262, the load on existing virtual circuits is calculated. This calculation is based on traffic measurements across the virtual circuit. The traffic flow across the network will change over time as network users initiate and later terminate particular applications. Similarly, the network topology may change over time due to failure and recovery of network equipment as well as the addition and removal of network equipment. Based on these changes in the network, certain virtual circuits will need to be closed if they become underutilized. Step 264 determines whether any existing virtual circuits should be closed. This determination uses previous values calculated using the Dijkstra algorithm, thereby reducing processing time by not executing the Dijkstra algorithm again. Instead, new traffic measurements are used to determine the utilization of the virtual circuit. The determination regarding whether to close a virtual circuit is based on several factors including whether any destinations would become unreachable as a result of closing the virtual circuit and whether any existing virtual circuits would become overloaded. If a particular virtual circuit is determined to be underutilized, then the virtual circuit is closed at step 266. Otherwise, the virtual circuit is not altered, and the procedure continues to step 268 where the virtual circuits are analyzed as described with reference to FIG. 7, above.

Figure 13:
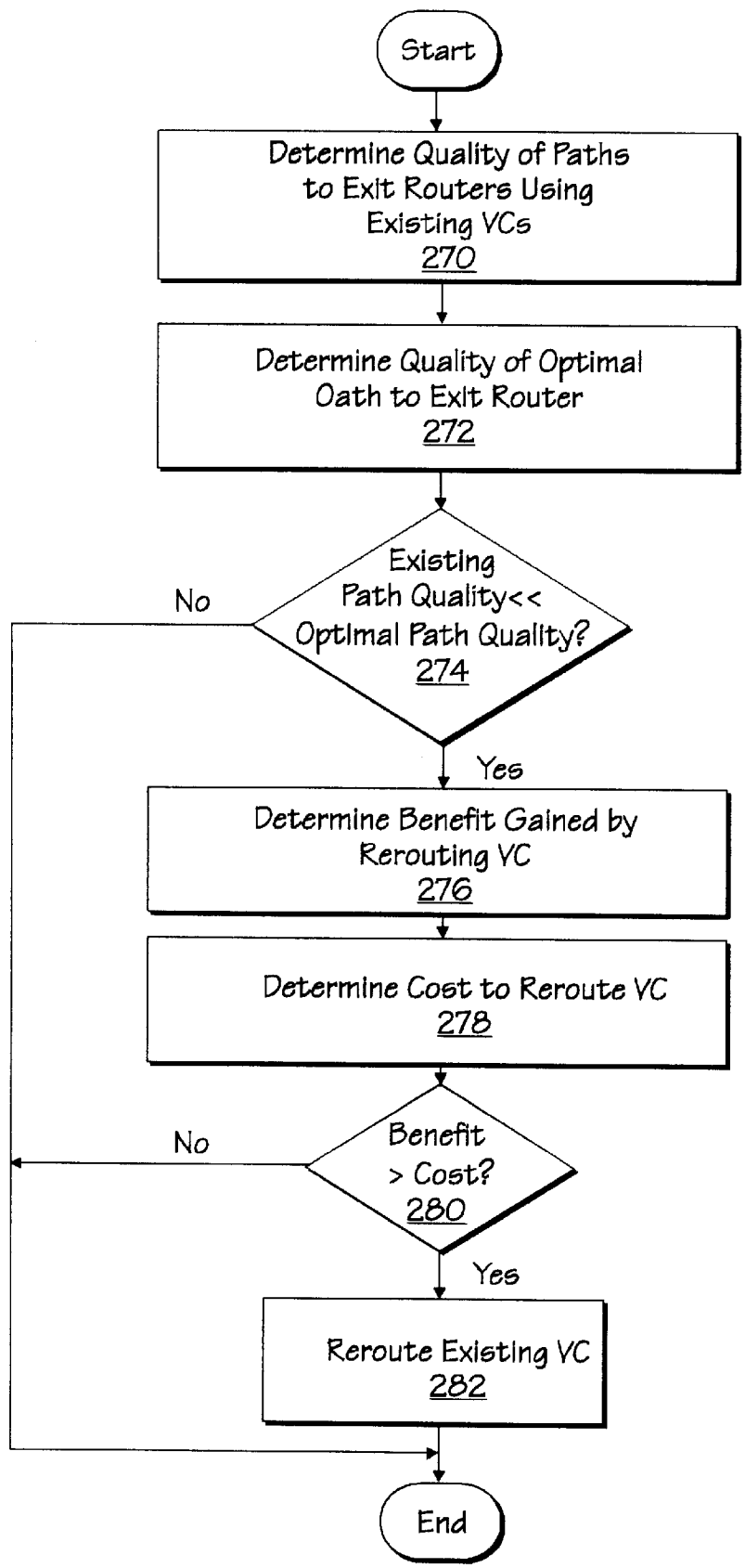
FIG. 13 is a flow diagram illustrating a procedure for determining whether to reroute an existing virtual circuit.

FIG. 13 is a flow diagram illustrating a procedure for determining whether to reroute an existing virtual circuit.

Rerouting of an existing virtual circuit may include opening a new virtual circuit, closing an existing virtual circuit, and any other virtual circuit modifications. As discussed above, this procedure may be performed as a background processing task at periodic intervals. Step 270 determines the quality of paths to each exit router using existing virtual circuits. At step 272, the quality of the optimal path to the exit router is determined. The values determined at steps 270 and 272 are computed as part of the feasibility and efficiency calculations described above. At step 274, if the quality of the existing path is substantially worse than the quality of the optimal path, then the routine branches to step 276. However, if step 274 determines that the existing path is only slightly worse than the optimal path, then the virtual circuit is not rerouted.

At step 276, the routine determines the benefit gained if the virtual circuit is rerouted. This benefit determination considers estimated traffic flow across the virtual circuit based on recent traffic flow measurements. Step 278 determines the cost (i.e., the time and system resources) associated with rerouting the virtual circuit. The benefit and cost determined in steps 276 and 278 are compared at step 280. If the benefit outweighs the cost, then the routine branches to step 282 to reroute the existing virtual circuit. If the benefit does not outweigh the cost, then the existing virtual circuit is not rerouted.

The preceding description and embodiments describe utilizing the present invention in a network environment using a similar routing protocol for both the ATM switches and the routers. However, the present invention may also be utilized in network environments where "layered routing" is used. Layered routing uses different routing protocols; i.e., one protocol for the ATM subnetwork and another protocol for the routers.

Figure 14A:
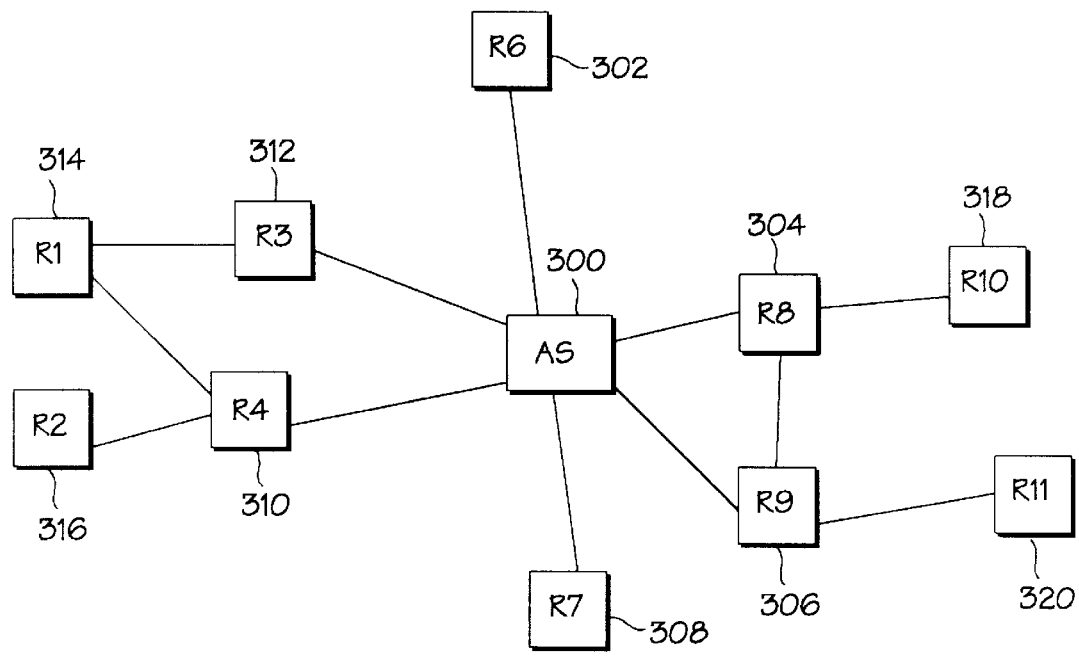
FIGS. 14A–14C illustrate a network configuration including a connection-oriented subnetwork.

Referring to FIG. 14A, a particular network is illustrated having an ATM subnetwork represented as a single node 300. FIG. 14A also illustrates ten routers 302–320 coupled to one another and ATM subnetwork 300. Routing within subnetwork 300 is independent of routing between routers 302–320. Therefore, a different routing protocol is used for routing between the routers. In a preferred implementation, the routers use a link state (or topology state) routing protocol. ATM switches (shown in FIG. 14B) within ATM subnetwork 300 may use any available routing protocol, including static routing. In an embodiment of the invention, the ATM switches use a link state protocol or topology state protocol.

FIG. 14A illustrates a logical router topology. Since two different routing protocols are used, the operation of the routing protocols is maintained relatively independent. Since the routers can forward packets using virtual circuits across ATM subnetwork 300, it is necessary to represent the capabilities of the subnetwork. If no virtual circuits are established across the ATM subnetwork, it is still necessary to advertise the availability of the ATM subnetwork into the router network. This advertising into the routing network is performed, for example, through the use of an Open Shortest Path First (OSPF) routing protocol.

FIG. 14A represents the ATM subnetwork using the single node 300 which may be referred to as a logical "ATM pseudonode." Node 300 has a link to each router having an ATM interface. In the absence of any existing virtual circuits, the other routers in the network believe that node 300 is a normal router. An actual physical system in the network, such as one of the routers having a direct ATM interface, assumes the functions of representing node 300. Selecting the physical system to handle these functions may be done manually by configuring one particular system to represent node 300, or by running an election algorithm. Different election algorithms capable of being used with the present invention are provided by the OSPF, IS—IS, and PNNI routing protocols.

When a virtual circuit already exists or is created across the ATM subnetwork, an issue arises regarding when to advertise the existence of the virtual circuit into the router-to-router routing protocol. A first option is to refrain from advertising the existence of the virtual circuit. If this option is selected, the logical topology of the network as advertised into the routing protocol remains identical to that illustrated in FIG. 14A. A second option explicitly advertises the existence of the virtual circuit. Using this second option, the topology illustrated in FIG. 14A is enhanced by adding links between routers corresponding to the existing virtual circuits. When using the second option, the metrics associated with the additional links would create a preference for existing virtual circuits, if available.

If a packet arrives at a router having an ATM interface and the correct path for the packet traverses the ATM subnetwork, then the questions of feasibility and efficiency arise. In this situation, the source router will have knowledge of the OSPF logical topology and knowledge regarding which virtual circuits are established to other routers. Additionally, the source router may have knowledge regarding details of the connections within the ATM subnetwork.

In a typical situation where layered routing is used, the routers bordering the ATM subnetwork do not participate in the routing operation in the ATM subnetwork. In this situation, a router only knows details of the logical router topology (e.g., the topology as illustrated in FIG. 14A) and the existence of any virtual circuits attached to the router itself. Feasibility and efficiency in this case are calculated based only on the logical router topology. The progress made by virtual circuit "i" is represented by $P_i$. This progress is compared to the progress $P_o$ made by the optimal virtual circuit. The first two efficiency tests, as previously described, can be calculated ($P_i \geq k \cdot P_o$ and $P_i \geq P_{min}$). However, in this situation the router does not know the cost associated with every virtual circuit in crossing the ATM subnetwork. Thus, the third efficiency test ($P_i \geq r \cdot C_i$) cannot be performed.

Figure 14B:
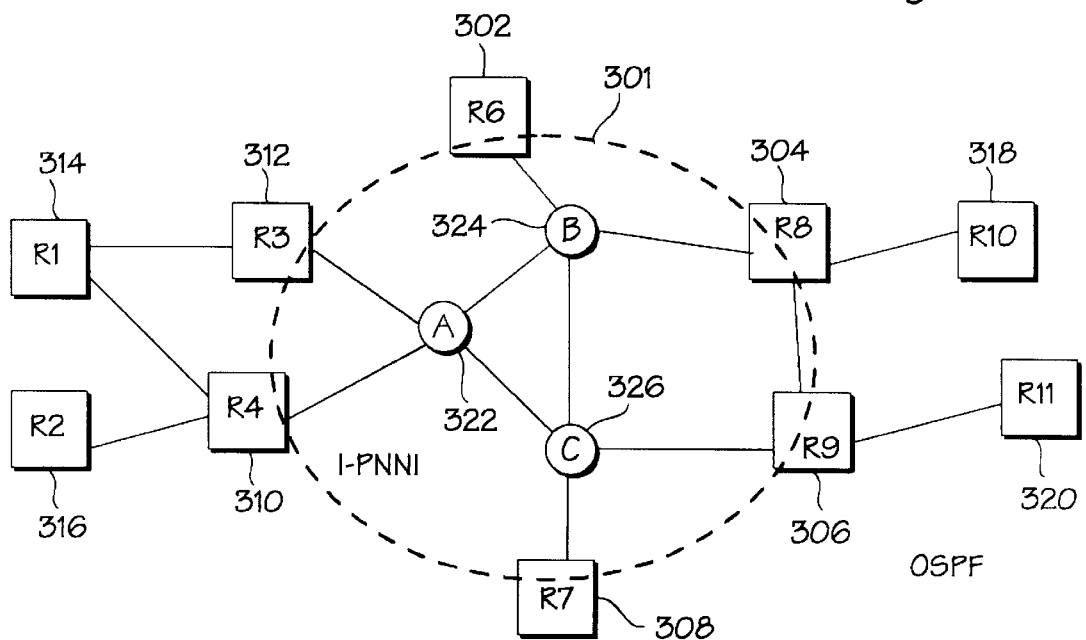

Referring to FIG. 14B, a network configuration is illustrated similar to that of FIG. 14A, where the ATM subnetwork is shown in greater detail (an enhanced topology). In this example, all ten routers (302–320) participate in a link state routing protocol, such as OSPF. FIG. 14B also illustrates three ATM switches 322, 324, and 326. The ATM switches and the routers bordering the ATM subnetwork (routers 302, 304, 306, 308, 310, and 312) participate in the operation of a separate link state or topology state routing protocol, such as I-PNNI. In this example, the routers bordering the ATM subnetwork are capable of "understanding" the enhanced topology illustrated in FIG. 14B. This "understanding" includes both the topology of the routers as advertised in a first routing protocol, and the topology of the ATM subnetwork as advertised in a second routing protocol.

When comparing costs of links and nodes in the ATM subnetwork to costs of links and nodes in the router network in the enhanced topology, the metrics used by the first routing protocol must be compared with metrics used by the second routing protocol. As discussed above, Lagrange multipliers may be used to compare dissimilar resource metrics.

The feasibility calculation ensures that packets will make continuous progress toward the destination without looping.

Since forwarding datagrams is based on "hop-by-hop" routing, each router must make a consistent routing decision. This implies that all routers along the path must have the ability to make routing decisions based on the same topology database. The logical router topology is the only database that all routers, including those routers not attached to the ATM subnetwork, have in common. Therefore, the next hop across the ATM subnetwork chosen by a router must be feasible according to the logical router topology. However, the router may use additional information regarding the ATM subnetwork when selecting the best route from among multiple feasible routes.

Figure 14C:
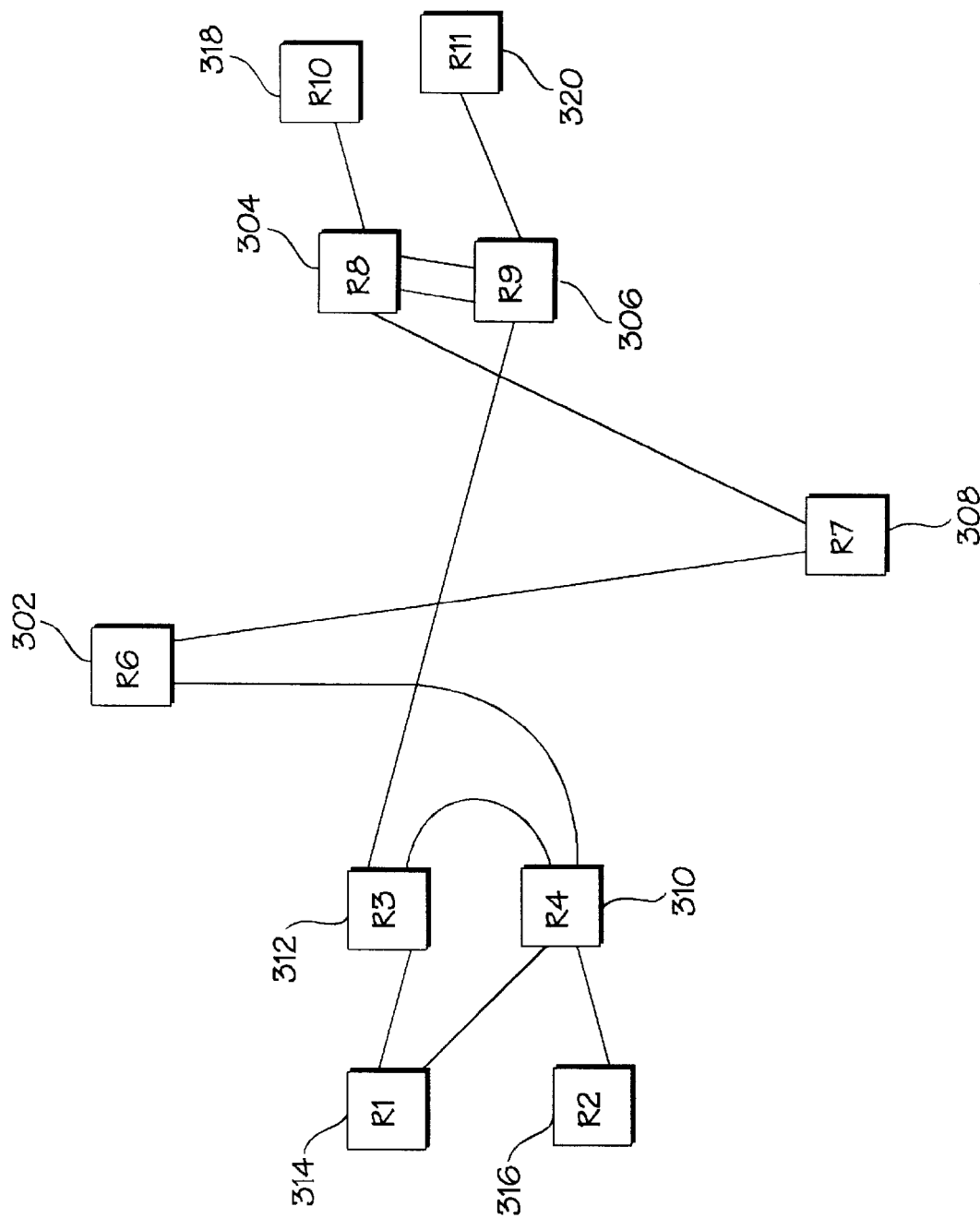

An alternative to using the "ATM pseudonode" as discussed above and illustrated FIG. 14A, provides a partial set of "default virtual circuits" established between the various routers 302–320. The default virtual circuits are established upon initialization of the network, prior to the arrival of any specific network traffic. Those skilled in the art will appreciate that numerous methods exist for establishing a set of default virtual circuits. A particular method for establishing default virtual circuits is based on the router ID of each router. Each router is permitted to establish a direct virtual circuit to the "k" next higher numbered routers. The highest numbered router is permitted to establish a direct virtual circuit to the lowest numbered router. For example, if k=1, then router R3 establishes a virtual circuit to R4, router R4 establishes a virtual circuit to R5, etc. Finally, router R9 (the highest numbered router) establishes a virtual circuit with R3 (the lowest numbered router). The resulting logical router topology using this method is illustrated in FIG. 14C. Note that router R5 does not exist in FIG. 14C. Instead, router R4 establishes a virtual circuit with router R6 (the next highest numbered router).

The default virtual circuits established using the above method are explicitly advertised into the router-to-router routing protocol (e.g., OSPF). Using the above method, the path between a particular pair of routers may require multiple hops across the ATM subnetwork. These multiple hops create an inaccurate characterization of the capabilities of the ATM subnetwork for the purpose of calculating OSPF routes. Alternate methods may be used to establish the default set of virtual circuits if the above characterization of the ATM subnetwork is unacceptable for a particular network environment.

An alternate method uses the same method described above, but provides a value for "k" larger than one. In the example illustrated in FIG. 14C, six routers are coupled to the ATM subnetwork. If k=3, then a full mesh of virtual circuits would be established.

Another alternative to the above methods for establishing a set of default virtual circuits provides for establishing "major diagonal" virtual circuits. For example, each router in the lower half of the name space establishes a virtual circuit to the router which is exactly half the name space higher. Another alternative method provides for establishing all possible virtual circuits in a network where the number of routers coupled to the ATM subnetwork is small.

Using any of the above methods for establishing a default set of virtual circuits, OSPF packets are forwarded between routers using the default virtual circuits as if they were normal links between the routers.

In many situations, network managers in a particular environment may know that there is likely to be frequent traffic between particular routers. In these situations, associated virtual circuits (either permanent virtual circuits or switched virtual circuits) may be established through network management control. These virtual circuits are established in addition to any other virtual circuits established using the methods discussed above.

In the examples discussed above, routers coupled to an ATM subnetwork and running PNNI augmented routing (also referred to as layered-mode I-PNNI) participate as regular PNNI nodes, exchange information with neighboring ATM switches and routers in the network. These routers provide the following information in their I-PNNI packets: links to neighboring ATM switches (including link metrics), node ID, ATM address, whether the node is transit-restricted, the protocol suite supported (IP), the router ID, the routing protocol used, and if OSPF is being used, the area in which the router is located.

When multiple OSPF areas exist in the same PNNI Peer Group, each OSPF area operates independently. Each router is capable of determining (based on information broadcast by other routers) whether the other routers are in the same OSPF area. Routers located in other OSPF areas are ignored. Routers located in the same area are contacted; e.g., by establishing default virtual circuits as appropriate.

Hierarchical operation of PNNI augmented routing may be supported. In this situation, each group of routers in the same OSPF area (or EGP domain or RIP group) within a single peer group elects a group representative. The announcement from the group representative is advertised into the higher level peer group. The group representative then contacts other representatives identified in the higher-level PNNI peer group.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for managing virtual circuits in a network having a connection-oriented subnetwork, said method comprising the steps of:

determining existing paths to an exit router;
   determining existing path qualities associated with each of said paths to said exit router;
   determining an optimal path quality associated with an optimal path to said exit router; and
   determining a benefit and a cost associated with rerouting an existing virtual circuit; and
   rerouting said existing virtual circuit if said optimal path quality exceeds said existing path qualities and said benefit exceeds said cost associated with modifying an existing virtual circuit.

2. The method of claim 1 wherein said routers and said connection-oriented subnetwork utilize a single link state routing protocol.

3. The method of claim 1 wherein the step of rerouting an existing virtual circuit includes establishing a new virtual circuit to said exit router.

4. A method for man aging the establishment of new virtual circuits in a network having a connection-oriented subnetwork, said method comprising the steps of:

determining a number of outstanding virtual circuit setup requests;
   determining a number of existing virtual circuits in said network;
   comparing said number of outstanding virtual circuit requests and said number of existing virtual circuits with a maximum value; and establishing a new virtual circuit if said maximum value is less than said number of outstanding virtual circuit requests and said number of existing virtual circuits.

5. The method of claim 4 wherein said method for managing the establishment of new virtual circuits is performed as a background process.

6. The method of claim 4 wherein the step of establishing a new virtual circuit is performed in response to receiving a virtual circuit setup request.

7. The method of claim 4 wherein the step of establishing a new virtual circuit includes determining and establishing a highest priority virtual circuit.

8. The method of claim 4 wherein a first maximum value is associated with said number of outstanding virtual circuit setup requests and a second maximum value is associated with a sum of said outstanding virtual circuit setup requests and said number of existing virtual circuits.

9. The method of claim 4 further including the step of detecting a failure of the attempt to establish a new virtual circuit.

10. A method for determining whether to establish a new virtual circuit in a network having a connection-oriented subnetwork, said method comprising the steps of:

determining a benefit associated with establishing the new virtual circuit;

determining a cost associated with establishing the new virtual circuit;

comparing said benefit of the new virtual circuit with said cost of the new virtual circuit; and establishing the new virtual circuit if said benefit exceeds said cost.

11. The method of claim 10 wherein the step of establishing the new virtual circuit utilizes a timer for controlling a frequency at which new virtual circuits are established.

12. The method of claim 10 wherein the step of establishing the new virtual circuit includes:

determining a current value of a virtual circuit setup timer;

determining a timer threshold value; and establishing the new virtual circuit if said current value of said virtual circuit setup timer exceeds said timer threshold value.

13. The method of claim 10 wherein said benefit is calculated by determining a reduction in cost to each router and a traffic level at each router.

14. The method of claim 10 further including the step of detecting a failure of the attempt to establish a new virtual circuit.

15. An apparatus for managing the establishment of new virtual circuits in a network having a connection-oriented subnetwork, said apparatus comprising:

a determination mechanism configured to determine a number of outstanding virtual circuit setup requests, and wherein the determination mechanism is further configured to determine a number of existing virtual circuits in said network;

a comparison mechanism configured to compare said number of outstanding virtual circuit requests and said number of existing virtual circuits with a maximum value; and a virtual circuit establishment mechanism configured to establish a new virtual circuit if said maximum value is less than said number of outstanding virtual circuit requests and said number of existing virtual circuits.

\* \* \* \* \*

UNITED STATES PATENT AND TRADEMARK OFFICE
CERTIFICATE OF CORRECTION

PATENT NO. : 5,854,899
DATED : December 29, 1998
INVENTOR(S) : Callon et al.

It is certified that error appears in the above-identified patent and that said Letters Patent is hereby corrected as shown below:

In the Abstract at line 8 delete "virutal" and insert --virtual--

In column 20 at line 58 delete "man aging" and insert --managing--

Signed and Sealed this

Eleventh Day of May, 1999

Attest:

Q. TODD DICKINSON

Attesting Officer

Acting Commissioner of Patents and Trademarks